(12) United States Patent
Lin

(10) Patent No.: US 8,799,734 B2
(45) Date of Patent: *Aug. 5, 2014

(54) TRANSMISSION CONTROL METHODS AND DEVICES FOR COMMUNICATION SYSTEMS

(75) Inventor: Tzu-Ming Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1107 days.

This patent is subject to a terminal disclaimer.

(21) Appl. No.: 12/166,018

(22) Filed: Jul. 1, 2008

(65) Prior Publication Data

US 2009/0024895 A1 Jan. 22, 2009

Related U.S. Application Data

(63) Continuation-in-part of application No. 12/137,792, filed on Jun. 12, 2008.

(60) Provisional application No. 60/929,576, filed on Jul. 3, 2007, provisional application No. 60/929,799, filed on Jul. 12, 2007, provisional application No. 61/006,792, filed on Jan. 31, 2008.

(51) Int. Cl.
*H04L 1/18* (2006.01)

(52) U.S. Cl.
USPC .......................................................... 714/749

(58) Field of Classification Search
USPC .......................................................... 714/749
See application file for complete search history.

(56) References Cited

U.S. PATENT DOCUMENTS 5,081,625 A * 1/1992 Rhee et al. ..................... 714/55
5,434,866 A * 7/1995 Emerson et al. ............. 370/476

(Continued)

FOREIGN PATENT DOCUMENTS

JP 2007-300573 11/2007
JP 2008-543189 11/2008

(Continued)

OTHER PUBLICATIONS

Extended European Search Report, issued from the European Patent Office on Dec. 16, 2010, in corresponding European Patent Application No. 08252267.3 (7 pages).

(Continued)

*Primary Examiner* — Albert Decady
*Assistant Examiner* — Enam Ahmed
(74) *Attorney, Agent, or Firm* — Finnegan, Henderson, Farabow, Garrett & Dunner, LLP

(57) ABSTRACT

A system and method for transmission control by an access device in a wireless communication system including a plurality of receiving devices, including receiving, from a super ordinate device, first transmission data for transmission to a subscriber device, wherein the access device communicates with the plurality of receiving devices, and the subscriber device is one of the plurality of receiving devices. The system and method further include transmitting the first transmission data to the subscriber device, and generating, by the access device, a first access receipt indicator corresponding to the first transmission data. In addition, the system and method include sending the first access receipt indicator to the super ordinate device, and retransmitting, if the access device does not receive a first subscriber receipt indicator from the subscriber device indicating that the first transmission data is received by the subscriber device, one or more portions of the first transmission data to the subscriber device. The system and method further include receiving, by the access device, second transmission data for transmission to the subscriber device, generating, by the access device, a second access receipt indicator corresponding to the second transmission data, and sending the second access receipt indicator to the super ordinate device. Further, the system and method include retransmitting, if the access device does not receive a second subscriber receipt indicator from the subscriber device indicating that all of the second transmission data is received by the subscriber device, one or more portions of the second transmission data to the subscriber device.

65 Claims, 16 Drawing Sheets

(56) References Cited

U.S. PATENT DOCUMENTS

| | | | |
|---|---|---|---|
| 6,052,819 A * | 4/2000 | Barker et al. | 714/776 |
| 6,301,249 B1 | 10/2001 | Mansfield et al. | |
| 6,724,843 B1 | 4/2004 | Clarkson et al. | |
| 7,719,966 B2 * | 5/2010 | Luft et al. | 370/229 |
| 7,742,483 B2 * | 6/2010 | Gessner et al. | 370/395.52 |
| 8,462,689 B2 * | 6/2013 | Johnson et al. | 370/314 |
| 2005/0276249 A1 * | 12/2005 | Damnjanovic et al. | 370/335 |
| 2006/0282739 A1 | 12/2006 | Meyer et al. | |
| 2007/0124642 A1 | 5/2007 | Suh et al. | |
| 2007/0142939 A1 * | 6/2007 | Duffy et al. | 700/78 |
| 2007/0268981 A1 | 11/2007 | Heiskala | |
| 2009/0319853 A1 * | 12/2009 | Keyghobad et al. | 714/749 |

FOREIGN PATENT DOCUMENTS

| | | |
|---|---|---|
| KR | 10-2000-0013136 A | 3/2000 |
| TW | I267740 | 12/2006 |
| TW | I268076 | 12/2006 |
| TW | I269562 | 12/2006 |
| WO | WO 2006/024320 A1 | 3/2006 |
| WO | WO 2006/024321 | 3/2006 |
| WO | WO 2006024321 A1 * | 3/2006 |
| WO | WO 2006/128478 A1 | 12/2006 |

OTHER PUBLICATIONS

Wiemann, H.; Meyer, M.; Ludwig, R.; Chang Pae O; "A Novel Multi-Hop ARQ Concept," Proceedings of Vehicular Technology Conference—VTC 2005 spring, vol. 5, pp. 3097-3101, in Jun. 2005.

Lott, M.; "ARQ for Multi-Hop Networks," Proceedings of Vehicular Technology Conference—VTC 2005 fall, vol. 3, pp. 1708-1712, in Sep. 2005.

IEEE C802.16j-06/176r1, "An Advanced ARQ Schema ($A^2RQ$) on relay Link for 802.16j" (Nov. 2006).

IEEE C802.16j-07/250r6, "An ARQ in IEEE 802.16j" (May 2007).

IEEE 802.16-2004, "Air Interface for Fixed Broadband Wireless Access Systems" (Oct. 2004).

IEEE 802.16j-07/470r1, Technical Comments to P602.16j Baseline Document: 6.3.4 ARQ Operation—MR-ARQ (Sep. 2007).

U.S. Appl. No. 12/137,792 of LIN filed Jun. 12, 2008.

Taiwanese Office Action issued in Application No. 097124960, May 17, 2012, 9 pages.

Japanese Office Action issued in Application No. JP2012-112451, mailed Sep. 17, 2013, 15 pages (including translation).

Notice to Submit a Response issued by Korean Intellectual Property Office for application No. 10-2006-0064124 on Mar. 14, 2014 and English translation.

Japanese Patent Office Notification of Reasons for Refusal together and English translation.

* cited by examiner

TRANSMISSION CONTROL METHODS AND DEVICES FOR COMMUNICATION SYSTEMS

PRIORITY

This application is a Continuation-in-Part of U.S. patent application Ser. No. 12/137,792, filed Jun. 12, 2008, pending, which is incorporated by reference herein in its entirety for any purpose. In addition, this application claims the benefit of priority of U.S. Provisional Application No. 60/929,576, filed Jul. 3, 2007, U.S. Provisional Application No. 60/929,799, filed Jul. 12, 2007, and U.S. Provisional Application No. 61/006,792, filed Jan. 31, 2008, all of which are incorporated by reference herein in their entirety for any purpose.

TECHNICAL FIELD

The present disclosure relates generally to methods and devices for communication systems and, more particularly, to methods and devices for transmission control in data communication systems.

BACKGROUND

Wireless communication systems allow wireless devices to communicate without the necessity of wired connections. Because wireless systems have become so integrated into daily life, there is a growing demand for wireless communication systems that support multimedia services such as speech, audio, video, file and web downloading, and the like. To support these multimedia services for wireless devices, various wireless communication systems and protocols have been developed to accommodate the growing demands of multimedia services over wireless communication networks.

One such protocol is Wideband Code Division Multiple Access (W-CDMA), which is promulgated by the 3$^{rd}$ Generation Partnership Project (3GPP™), a collaboration of numerous standards development organizations. W-CDMA is a wideband spread-spectrum mobile air interface that uses a direct sequence Code Division Multiple Access (CDMA).

Communication in such wireless systems may include both single-hop and multi-hop transmission. In single-hop wireless transmission, an origination node communicates directly with the destination node. In contrast, in multi-hop wireless transmission, an origination node of a wireless system may communicate with a destination node using one or more intermediate nodes, sometimes called relay nodes. In some systems, the relay node may be referred to as a relay station, and the combination of nodes and connections between an originating node and a destination node may be referred to as a transmission path. Relay-based systems may be found in any type of wireless network.

FIG. 1 is a diagram of an exemplary prior art wireless network 100 having both multi-hop and single-hop transmission. The exemplary wireless network 100 of FIG. 1 is based on the Institute of Electrical and Electronics Engineers (IEEE) 802.16 family of standards. As shown in FIG. 1, wireless network 100 may include one or more transmitters, e.g., base station (BS) 110, one or more relay stations (RS) 120, including RSs 120a, 120b, and 120c, and one or more subscriber stations (SS) 130, including SSs 130a, 130b, 130c, and 130d.

In wireless network 100, communication between an origination node (e.g., BS 110) and a destination node (e.g., SS 130a, SS 130b, SS 130c, SS 130d, etc.) may be achieved using one or more relay stations (e.g., RS 120a, RS 120b, RS 120c, etc.). For example, in wireless network 100, RS 120a may receive data from BS 110 and send the data to another relay station (e.g., RS 120b). Alternatively, RS 120a may receive data from another relay station (e.g., RS 120b), and send it to BS 110. As another example, RS 120c may receive data from RS 120b and send the data to a supported subscriber station (e.g., SS 130a). Alternatively, RS 120c may receive data from a subscriber station (e.g., SS 130a), and send it to a dominant relay station (e.g., RS 120b). These are examples of multi-hop transmissions. In single-hop transmission in wireless network 100, communication between the origination node (e.g., BS 110) and the destination node (e.g., SS 130d) may be achieved directly. For example, BS 110 may send data directly to SS 130d, and SS 130d may send data directly to BS 110.

A wireless system, such as wireless network 100 described in FIG. 1, may implement a Media Access Control (MAC) frame format based on the IEEE 802.16 family of standards using Orthogonal Frequency-Division Multiple Access (OFDMA). In wireless system 100, transmission time may be divided into variable length sub-frames: an uplink (UL) sub-frame and a downlink (DL) sub-frame. Generally, the UL sub-frame may include ranging channels, a channel quality information channel (CQICH), and UL data bursts containing data.

The DL sub-frame may include a preamble, a Frame Control Header (FCH), a DL-MAP, a UL-MAP, and a DL data burst area. The preamble may be used to provide a reference for synchronization. For example, the preamble may be used to adjust a timing offset, a frequency offset, and power. The FCH may contain frame control information for each connection including, for example, decode information for SSs 130.

The DL-MAP and UL-MAP may be used to allocate channel access for both uplink and downlink communication. That is, the DL-MAP may provide a directory of access slot locations within the current downlink sub-frame, and the UL-MAP may provide a directory of access slot locations within the current uplink sub-frame. In the DL-MAP, this directory may take the form of one or more DL-MAP Information Elements (MAP IEs). Each MAP IE in the DL-MAP may contain parameters for a single connection (i.e., the connection with a single SS 130). These parameters may be used to identify where, in the current sub-frame, a data burst may be located, the length of the data burst, the identity of the intended recipient of the data burst, and one or more transmission parameters.

For example, each MAP IE may contain a Connection ID (CID), identifying the destination device (e.g., SS 130a, SS 130b, SS 130c, SS 130d, etc.) for which a data burst is intended, a Downlink Interval Usage Code (DIUC), representing a downlink interval usage code by which downlink transmission is defined, an OFDMA Symbol Offset, indicating the offset of the OFDMA symbol in which a data burst starts, a sub-channel offset, indicating the lowest-index OFDMA sub-channel for carrying the burst, etc. Other parameters may also be included in the MAP IE such as, for example, a boosting parameter, a parameter indicating a number of OFDMA symbols, a parameter indicating a number of sub-channels, etc. As used herein, prior art MAC headers (e.g., FCH) and MAP IEs may be referred to as connection-switched control data.

The DL-MAP and UL-MAP may each be followed by the data burst area. The data burst area may include one or more data bursts. Each data burst in the data burst area may be modulated and coded according to the control type of a corresponding connection-switched control data. Generally, the DL-MAP and UL-MAP may be referred to as packet data units (PDUs) or simply packet data.

An exemplary transmission control mechanism for use in systems such as the wireless network 100 of FIG. 1 is Automatic Repeat Request (ARQ). Using ARQ, the devices of a wireless system (e.g., BS 110, RSs 120a, 120b, and 120c, and SSs 130a, 130b, 130c, and 130d, etc.) may be configured to retransmit packet data when the packet data is either not received by the intended recipient or received with errors. The ARQ transmission control mechanism may use a combination of ACKs, NACKs, and timeouts to communicate the status of transmitted data. Exemplary ARQ protocols may include Stop-And-Wait (SAW), Go-Back-N, and Selective Repeat.

In a wireless system using ARQ transmission control mechanisms, when the receiving device receives packet data (new or retransmitted), the receiving device may generate and send either an ACK or a NACK to the transmitting device. An ACK may be an acknowledgment indicator, included within or as an attachment to a message, and may be sent by a receiver to a transmitter to indicate that the receiver has correctly received the transmitted data. A NACK may be a negative acknowledgment indicator, included within or as an attachment to a message, and may be sent by a receiver to the transmitter indicating that the transmitted data has been received with one or more errors.

FIG. 2 is a signaling diagram 200 illustrating operation of an exemplary end-to-end ARQ transmission control mechanism. As shown in FIG. 2, in systems implementing distributed resource allocation, each node in the transmission path allocates resources to the next node in the relay path. For example, in a system implementing distributed resource allocation, BS 110 may allocate resources for RS 120a, denoted by the arrow between BS 110 and RS 120a. Similarly, RS 120a may allocate resources for RS 120b, denoted by the arrow between RS 120a and RS 120b, and so on. In a system using centralized resource allocation, BS 110 may transmit control information to all nodes in a transmission path, e.g., RS 120a, RS 120b, RS 120c, and SS 130a, to perform resource allocation. In either case, after the resource allocation has been completed, BS 110 may send data to the destination node, SS 130a, via the intermediate nodes RS 120a, RS 120b, and RS 120c. In addition, BS 110 may store a copy of the sent data in a buffer. In the example of FIG. 2, the data consists of eight (8) packets of data.

RS 120a may successfully receive the 8 packets of data, store a copy of the data in its buffer, and send the data to RS 120b. Between RS 120a and RS 120b, however, 2 packets of data may be lost due to corruption, interference, error, etc., and RS 120b may receive only 6 packets of data. RS 120b may transmit the 6 packets of data to RS 120c and store a copy of the transmitted data in its buffer. Similarly, RS 120c may receive the 6 packets of data, transmit the 6 packets of data to SS 130a, and store a copy of the transmitted data in its buffer. However, between RS 120c and SS 130a another 3 packets of data may be lost, resulting in only 3 packets of data being successfully received by SS 130a. Upon receipt of the 3 packets of data, SS 130a may send an ACK indicator along the uplink transmission path to BS 110 via RS 120c, RS 120b, and RS 120c. The ACK indicator may be used to identify and acknowledge successful receipt of the 3 packets of data. When BS 110 receives the ACK indicator, BS 110 may purge the buffer of the identified 3 packets of data.

Once BS 110 has purged the buffer, BS 110 may prepare 3 packets of new data to transmit to SS 130a. In some scenarios, BS 110 may communicate with each of RSs 120a, 120b, and 120c to determine how to localize retransmission of data so that each RS 120 can receive the correct data from its most direct node in the uplink direction (i.e., super ordinate node).

When BS 110 has determined how to localize retransmission, BS 110 may then re-allocate the resources along the transmission path by means of the centralized allocation of resources. Alternatively, performing distributed allocation of resources, each node in the transmission path may re-allocate resources to a next node along the transmission path (uplink or downlink). In either case, once the resources have been re-allocated, BS 110 may then send the 3 packets of new data to SS 130a via RS 120a.

RS 120a may receive the data and add the 2 packets of data lost between RS 120a and RS 120b to the data for retransmission to RS 120b (i.e., Data (2+3')). RS 120b may receive Data (2+3'), transmit Data (2+3') to RS 120c, and store the new data (i.e., Data (3')) in its buffer. Similarly, RS 120c may receive Data (2+3') and add the 3 packets of data lost between RS 120c and SS 130a to Data (2+3') resulting in Data (5+3'). RS 120c may transmit Data (5+3') to SS 130a, and store a copy of the new data (i.e., Data (3')) in its purge buffer. SS 130a may receive both the new and retransmitted data (i.e., Data (5+3')), and transmit an ACK indicator to BS 110 via RS 120a, RS 120b, and RS 120c. The transmitted ACK indicator may acknowledge receipt of 8 packets of data (i.e., ACK (5+3')), with 3 packets being new data and 5 packets being retransmitted data. Upon receipt of the ACK indicator, BS 110 may purge its buffer of both the new and old data.

FIG. 3 is a signaling diagram 300 illustrating operation of an exemplary two-segment ARQ transmission control mechanism. In a system using a two-segment ARQ transmission control mechanism, an access node (e.g., intermediate nodes RS 120a, 120b, and 120c) sends an ACK indicator back to the transmitting node (e.g., BS 110) to indicate the current state of the transmission and whether or not the transmission is successfully received by the access node. Here, an access node refers to the intermediate node (e.g., RS 120a, RS 120b, RS 120c, etc.) communicating directly with the intended destination node (e.g., SS 130a, SS 130b, SS 130c, SS 130d, etc.). For example, the access node corresponding to SS 130a may be RS 120c.

Similarly to FIG. 2, FIG. 3 shows that BS 110 may transmit control information to all nodes in a transmission path to perform resource allocation in a system performing centralized allocation of resources. For example, for a transmission path from BS 110 to SS 130a, BS 110 may perform resource allocation for RS 120a, RS 120b, RS 120c, and SS 130a. In the alternative, in a system performing distributed allocation of resources, each node in the transmission path may allocate resources to a next node along the transmission path (uplink or downlink). For example, for a transmission path from BS 110 to SS 130a, BS 110 may perform resource allocation from BS 110 to RS 120a, RS 120a may perform resource allocation from RS 120a to RS 120b, RS 120b may perform resource allocation from RS 120b to RS 120c, and RS 120c may perform resource allocation from RS 120c to SS 130a. In either case, once the resource allocation has been completed, BS 110 may send data to the destination node, SS 130a, via the intermediate nodes RS 120a, RS 120b, and RS 120c. In addition, BS 110 may store a copy of the sent data in a buffer. In the example of FIG. 3, the data may consist of eight (8) packets of data.

RS 120a may successfully receive the 8 packets of data, store a copy of the received data in its buffer, and send the data to RS 120b. RS 120b may successfully receive the 8 packets of data, store a copy of the received data in its buffer, and send the data to RS 120c. Between RS 120b and RS 120c, however, 2 packets of data may be lost due to corruption, interference, error, etc., and RS 120c may receive only 6 packets of data.

RS 120*c* may send a pre-ACK indicator to BS 110 acknowledging receipt of the 6 packets of data.

In addition, RS 120*c* may transmit the 6 packets of received data to SS 130*a*, and store a copy of the transmitted data in its buffer. In the transmission between RS 120*c* and SS 130*a*, however, another 4 packets of data may be lost, resulting in only 2 packets of data being successfully received by SS 130*a*. Upon receipt of the 2 packets of data, SS 130*a* may send an ACK indicator to RS 120*c*. The ACK indicator may be used to identify and acknowledge successful receipt of the 2 packets of data by SS 130*a*. Upon receipt of the ACK, RS 120*c* may retransmit any data that was not successfully received by SS 130*a*. In FIG. 3, for example, RS 120*c* may retransmit the 4 packets of data that were lost in the transmission between RS 120*c* and SS 130*a*.

When BS 110 receives the ACK indicator from RS 120*c*, BS 110 may purge the buffer of the 6 packets of data identified as successfully received by RS 120*c*. Once BS 110 has purged its buffer, BS 110 may prepare 6' packets of new data to transmit to SS 130*a* along with the 2 packets of data that were lost between RS 120*b* and RS 120*c*. In some scenarios, BS 110 may communicate with each of RSs 120*a*, 120*b*, and 120*c* to determine the localized retransmission of data so that each RS 120 can receive the correct data from its most direct node along the uplink direction (i.e., super ordinate node). In other scenarios, however, BS 110 may not communicate with each of RSs 120*a*, 120*b*, and 120*c* to determine the localized retransmission of data.

When BS 110 has determined how to localize retransmission, in a system performing centralized allocation of resources, BS 110 may then re-allocate the resources along the transmission path. Alternatively, in a system performing distributed allocation of resources, each node in the transmission path may re-allocate resources to a next node along the transmission path (uplink or downlink). In either case, once the resources have been re-allocated, BS 110 may send Data (2+6') to SS 130*a* via RS 120*a*. RS 120*a* may successfully receive Data (2+6'), transmit the received Data (2+6') to RS 120*b*, and store a copy of Data (2+6') in its buffer. RS 120*b* may successfully receive Data (2+6'), transmit the received Data (2+6') to RS 120*c*, and store a copy of Data (2+6') in its buffer. Similarly, RS 120*c* may receive Data (2+6'), transmit the received Data (2+6') to RS 120*b*, and store a copy of Data (2+6') in its buffer. In addition, RS 120*c* may send an ACK indicator to BS 110, acknowledging receipt of the data successfully received by RS 120*c* (i.e., ACK {2+6'}).

SS 130*a* may receive both the new and retransmitted data (i.e., Data (2+6')), and transmit an ACK indicator to RS 130*c*. The ACK indicator may acknowledge successful receipt of 2+6' packets of data (i.e., ACK (2+6')), with 6' packets being new data and 2 packets being retransmitted data. Upon receipt of the ACK indicator, RS 130*c* may purge its buffer of both the new and old data that was indicated by SS 130*a* as successfully received.

Because of the increased number of segments in a transmission path, the effects of error detection and correction may be felt more acutely in a multi-hop wireless network than in a single-hop wireless network. Thus, traditional error detection and correction in multi-hop transmission may cause significant increases in overhead, longer delays, and wasted resources.

The disclosed embodiments are directed to overcoming one or more of the problems set forth above.

SUMMARY OF THE INVENTION

In one exemplary embodiment, the present disclosure is directed to a method for transmission control by an access device in a wireless communication system including a plurality of receiving devices. The method includes receiving, from a super ordinate device, first transmission data for transmission to a subscriber device, wherein the access device communicates with the plurality of receiving devices, and the subscriber device is one of the plurality of receiving devices. The method further includes transmitting the first transmission data to the subscriber device, and generating, by the access device, a first access receipt indicator corresponding to the first transmission data. In addition, the method includes sending the first access receipt indicator to the super ordinate device, and retransmitting, if the access device does not receive a first subscriber receipt indicator from the subscriber device indicating that the first transmission data is received by the subscriber device, one or more portions of the first transmission data to the subscriber device. The method further includes receiving, by the access device, second transmission data for transmission to the subscriber device, generating, by the access device, a second access receipt indicator corresponding to the second transmission data, and sending the second access receipt indicator to the super ordinate device. Further, the method includes retransmitting, if the access device does not receive a second subscriber receipt indicator from the subscriber device indicating that the second transmission data is received by the subscriber device, one or more portions of the second transmission data to the subscriber device.

In another exemplary embodiment, the present disclosure is directed to a wireless communication station for wireless communication. The wireless communication station includes at least one memory to store data and instructions, and at least one processor configured to access the memory and, when executing the instructions, to receive, from a super ordinate device, first transmission data for transmission to a subscriber device, wherein the wireless communication device communicates with the plurality of receiving devices and the subscriber device is one of the plurality of receiving devices. In addition, the at least one processor is further configured to transmit the first transmission data to the subscriber device, generate a first access receipt indicator corresponding to the first transmission data, and send the first access receipt indicator to the super ordinate device. The at least one processor is further configured to retransmit, if the wireless communication device does not receive a first subscriber indicator from the subscriber device indicating that the first transmission data is received by the subscriber device, one or more portions of the first transmission data to the subscriber device, and receive second transmission data for transmission to the subscriber device. Further, the at least one processor is configured to generate a second access receipt indicator corresponding to the second transmission data, send the second access receipt indicator to the super ordinate device, and retransmit, if the wireless communication device does not receive a second subscriber receipt indicator from the subscriber device indicating that the second transmission data is received by the subscriber device, one or more portions of the second transmission data to the subscriber device.

In one exemplary embodiment, the present disclosure is directed to a method for transmission control by an access device in a wireless communication system including a plurality of receiving devices. The method includes receiving, from a super ordinate device, transmission data for transmission to a subscriber device, wherein the access device communicates with the plurality of receiving devices, and the subscriber device is one of the plurality of receiving devices, and transmitting the transmission data to the subscriber device. The method further includes generating an access receipt indicator corresponding to the transmission data. If the access device receives an initial subscriber receipt indicator from the subscriber device, the method further includes including the access receipt indicator with the initial subscriber receipt indicator, and sending the access receipt indicator and the subscriber receipt indicator to the super ordinate device. If the access device does not receive the initial subscriber receipt indicator from the subscriber device, the method includes sending the access receipt indicator to the super ordinate device, and retransmitting at least a portion of the transmission data to the subscriber device.

In another exemplary embodiment, the present disclosure is directed to a wireless communication device for wireless communication. The wireless communication device includes at least one memory to store data and instructions, and at least one processor configured to access the memory and, when executing the instructions, to receive, from a super ordinate device, transmission data for transmission to a subscriber device, wherein the wireless communication device communicates with the plurality of receiving devices and the subscriber device is one of the plurality of receiving devices. In addition, the at least one processor is configured transmit the transmission data to the subscriber device, and generate an access receipt indicator corresponding to the transmission data. If the wireless communication device receives an initial subscriber receipt indicator from the subscriber device, the at least one processor is configured to include the access receipt indicator with the initial subscriber receipt indicator, and send the access receipt indicator and the subscriber receipt indicator to the super ordinate device. If the wireless communication device does not receive the initial subscriber receipt indicator from the subscriber device, the at least one processor is configured to send the access receipt indicator to the super ordinate device, and retransmit at least a portion of the transmission data to the subscriber device.

In another exemplary embodiment, the present disclosure is directed to a method for operating a wireless communication device in a wireless communication system. The method includes setting a device state to a first state, wherein the first state is an initial state, and changing, upon occurrence of a first triggering event, the device state from the first state to a second state, wherein the second state is defined as one in which data has been transmitted and a relay timer has not expired. The method further includes changing, when the relay timer expires, the device state from the second state to a third state and initiating retransmission of the data, and changing, when the relay timer has not expired and the wireless communication device receives one of an intermediate node NACK indicator, an end node NACK indicator, or a timeout, the device state from the second state to the third state. Further, the method includes changing, when the wireless communication device receives an end node ACK indicator and the relay timer has not expired, the device state from the second state to a fourth state.

In another exemplary embodiment, the present disclosure is directed to a wireless communication device for wireless communication. The wireless communication device includes at least one memory to store data and instructions, and at least one processor configured to access the memory and, when executing the instructions, to set a device state to a first state, wherein the first state is an initial state. In addition, the at least one processor is further configured to change, upon occurrence of a first triggering event, the device state from the first state to a second state, wherein the second state is defined as one in which data has been transmitted and a relay timer has not expired. Furthermore, the at least one processor is configured to change, when the relay timer expires, the device state from the second state to a third state and initiate retransmission of the data, and change, when the relay timer has not expired and the wireless communication device receives one of an intermediate node NACK indicator, an end node NACK indicator, or a timeout, the device state from the second state to the third state. Additionally, the at least one processor is configured to change, when the wireless communication device receives an end node ACK indicator and the relay timer has not expired, the device state from the second state to a fourth state.

DETAILED DESCRIPTION

Figure 1:
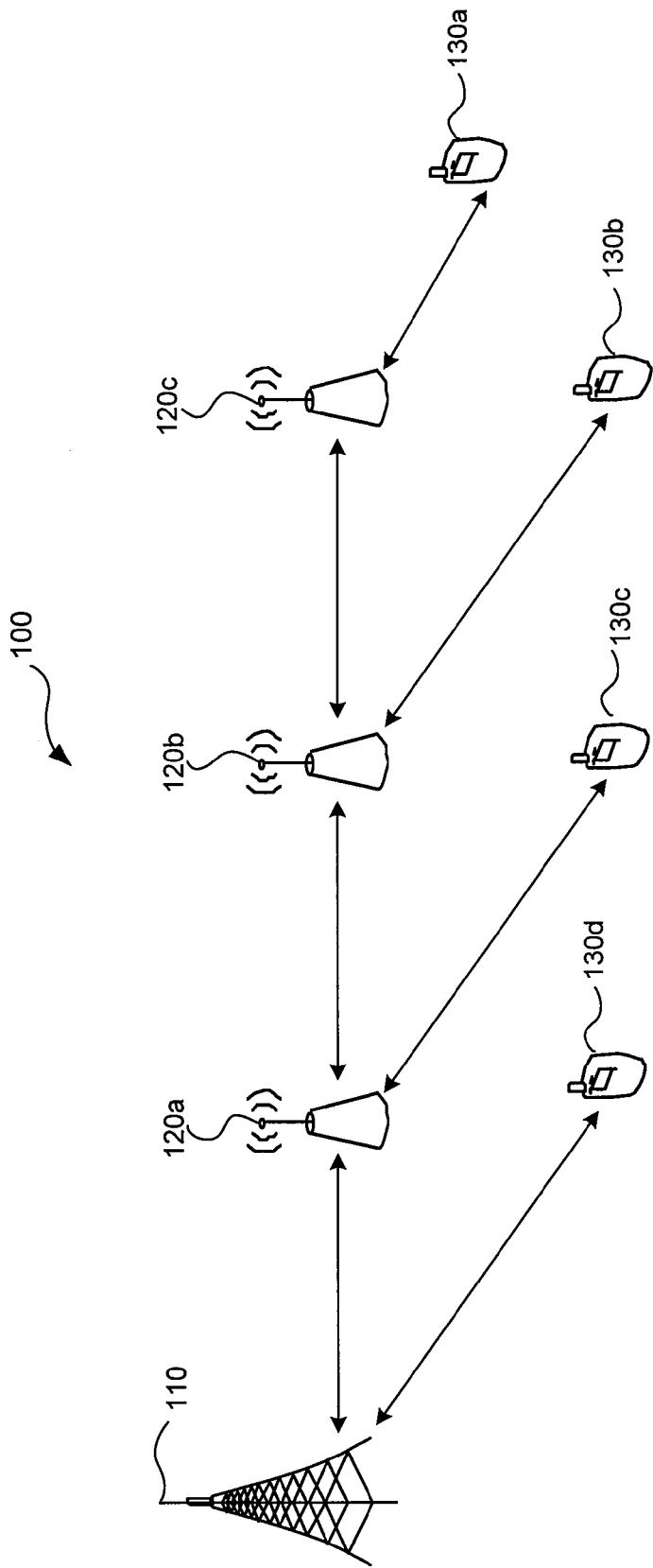
FIG. 1 is a block diagram of a wireless communication system.
Figure 2:
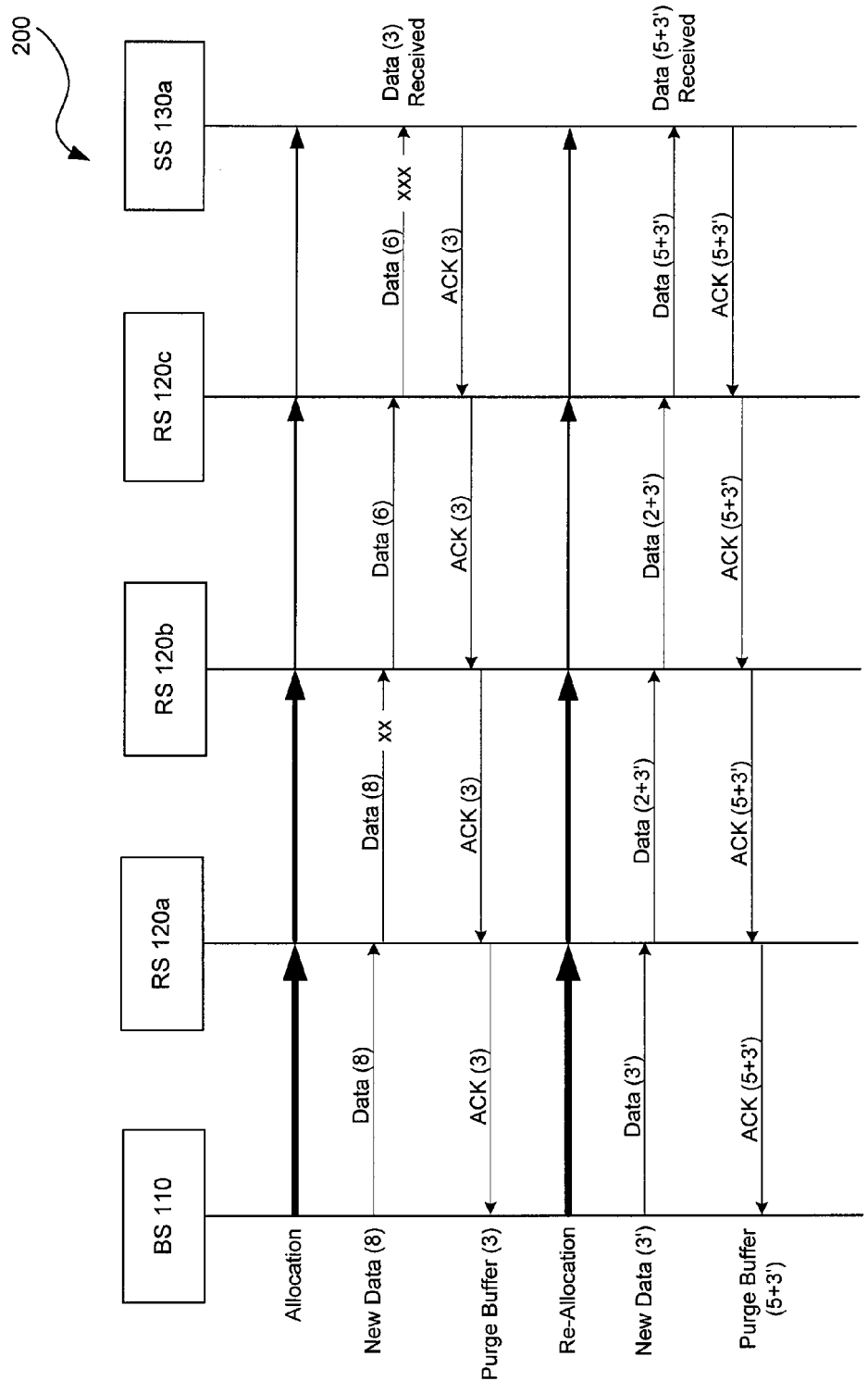
FIG. 2 is a signaling diagram for a prior art wireless communication system using end-to-end ACK messaging.
Figure 3:
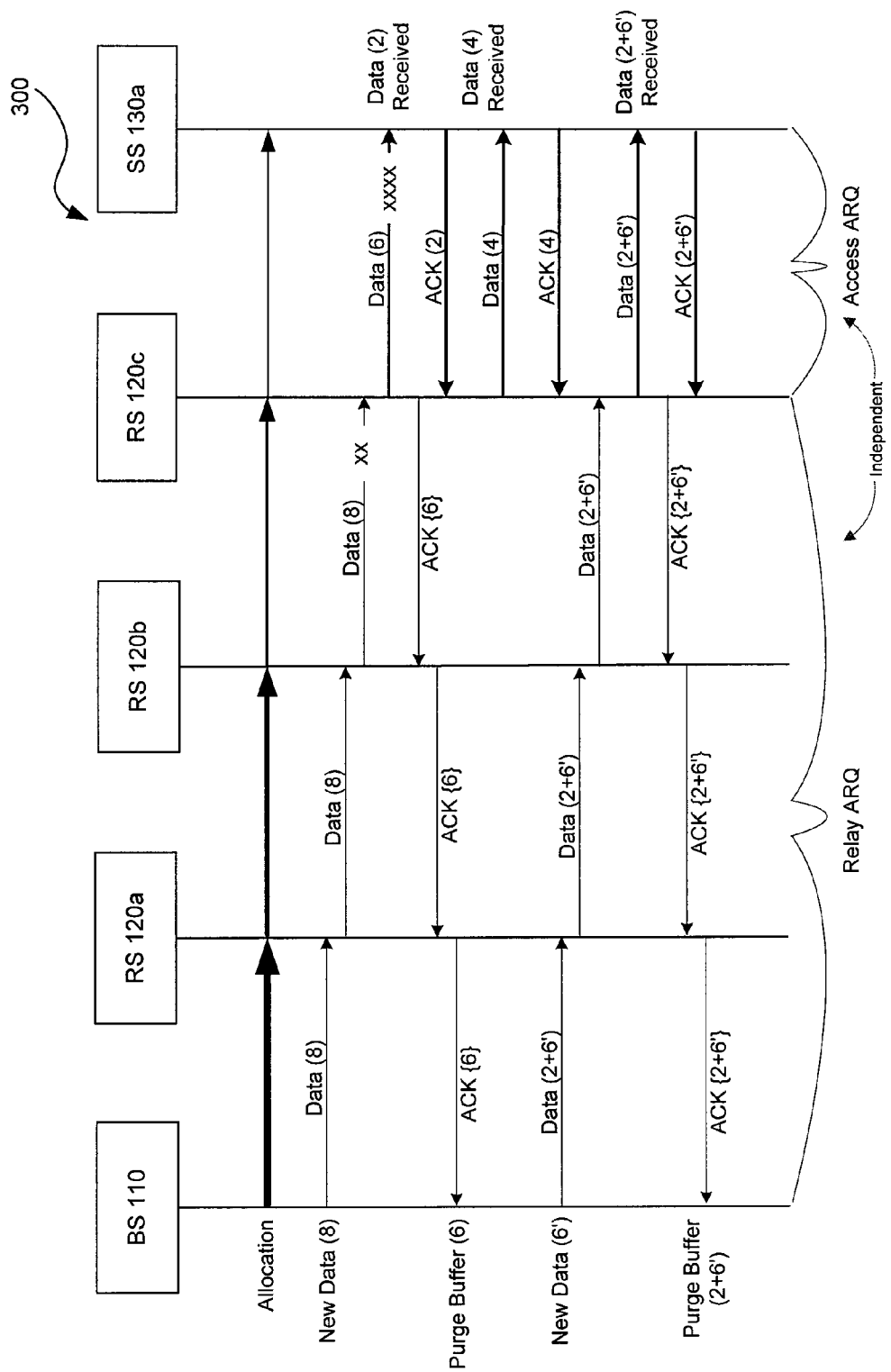
FIG. 3 is a signaling diagram for a prior art wireless communication system using two-segment ARQ mechanisms.
Figure 4:
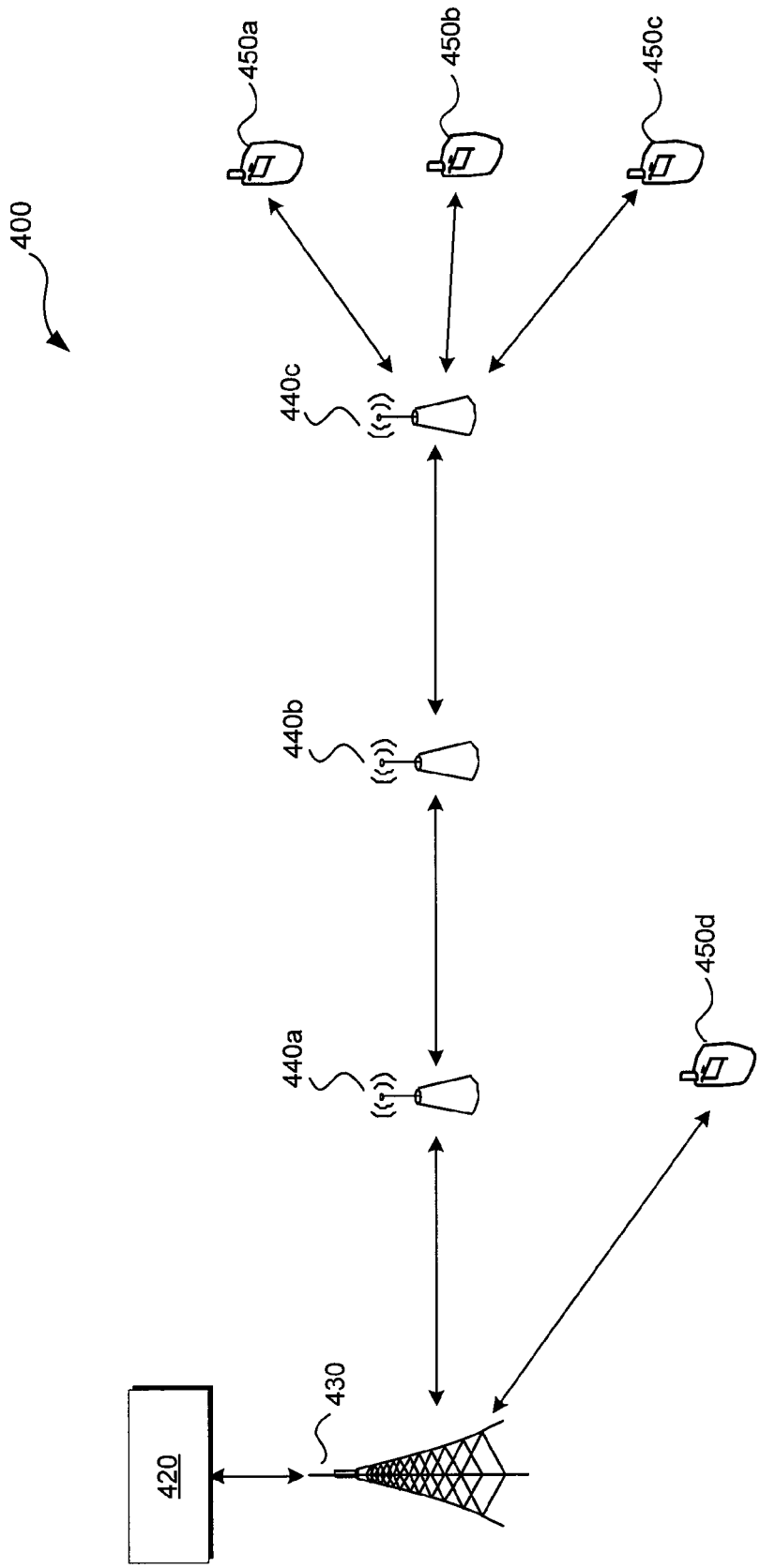
FIG. 4 is a block diagram of an exemplary wireless communication system, consistent with certain disclosed embodiments.

FIG. 4 is a block diagram of an exemplary wireless communication system 400. The exemplary wireless communication system 400 of FIG. 4 may be based, for example, on the Institute of Electrical and Electronics Engineers (IEEE) 802.16 family of standards. As shown in FIG. 4, wireless communication system 400 may include one or more Radio Network Controllers (RNC) 420, e.g., RNC 420, one or more base stations (BS) 430, e.g., BS 430, one or more relay stations (RS) 440, e.g., RS 440*a*, RS 440*b*, and RS 440*c*, and one or more subscriber stations (SS) 450, e.g., SS 450*a*, SS 450*b*, SS 450*c*, and SS 450*d*.

RNC 420 may be any type of communication device configured to operate in exemplary wireless communication system 400, many of which are known in the art. RNC 420 may be responsible for resource management, mobility management, encryption, etc. in wireless communication system 400. In addition, RNC 420 may be responsible for the control of one or more BSs 430.

Figure 5A:
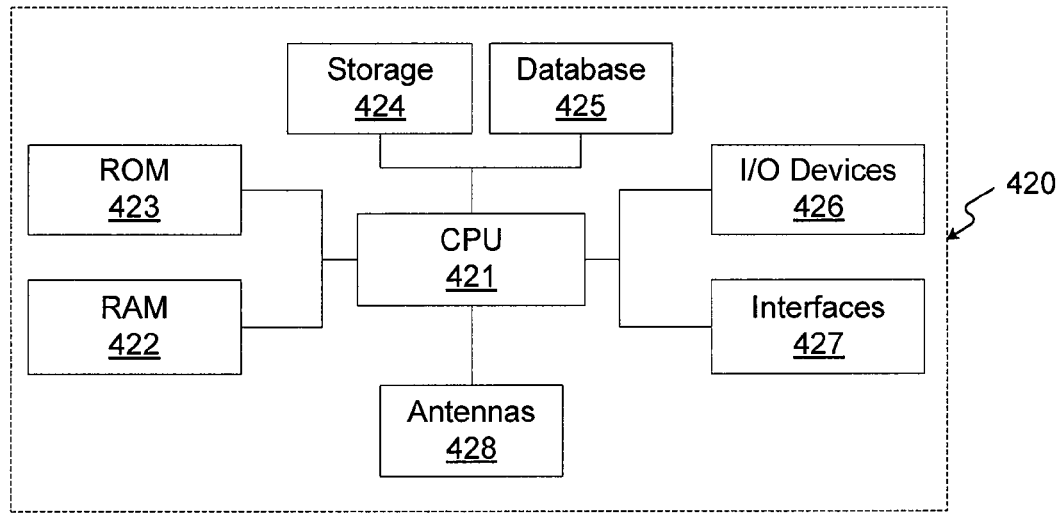
FIG. 5a is a block diagram of an exemplary radio network controller (RNC), consistent with certain disclosed embodiments.

FIG. 5*a* is a block diagram of an exemplary RNC 420, consistent with certain disclosed embodiments. As shown in FIG. 5*a*, each RNC 420 may include one or more of the following components: a central processing unit (CPU) 421 configured to execute computer program instructions to perform various processes and methods, random access memory (RAM) 422 and read only memory (ROM) 423 configured to access and store information and computer program instructions, a memory 424 to store data and information, databases 425 to store tables, lists, or other data structures, I/O devices 426, interfaces 427, antennas 428, etc. Each of these components is well-known in the art and will not be discussed further.

BS 430 may be any type of communication device configured to transmit and/or receive data and/or communications to and from one or more RSs 440 and/or SSs 450 in wireless communication system 400, many of which are known in the art. In some embodiments, BS 430 may also be referred to as, for example, a Node-B, a base transceiver system (BTS), an access point, etc. Communication between BS 430 and RNC 420 may be any combination of wired and/or wireless connections. Communication between BS 430 and RSs 440 may be wireless. Similarly, communication between BS 430 and SSs 450 may be wireless. In one exemplary embodiment, BS 430 may have a broadcast/reception range within which BS 430 may wirelessly communicate with one or more RSs 440 and/or one or more SSs 450. Broadcast ranges may vary due to power levels, location, and interference (physical, electrical, etc.).

Figure 5B:
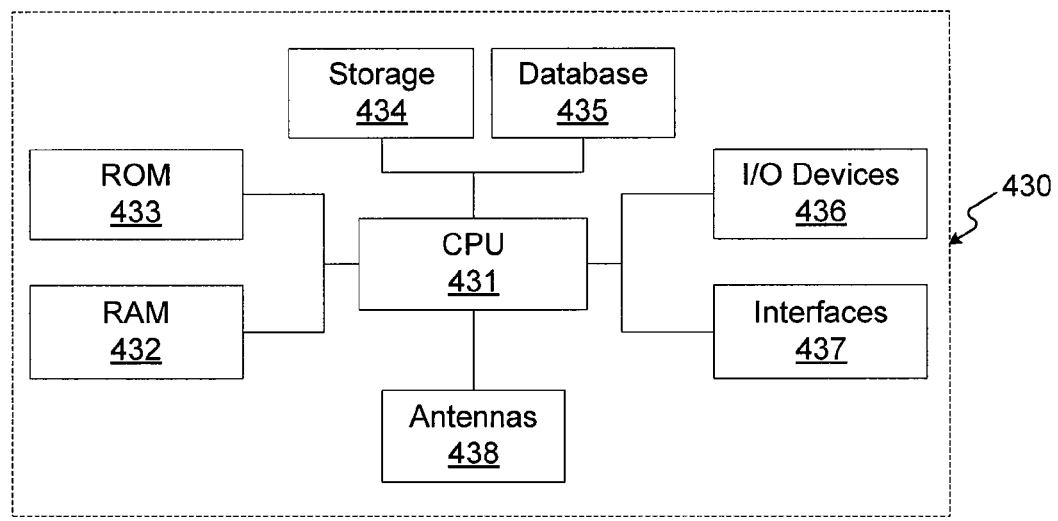
FIG. 5b is a block diagram of an exemplary base station (BS), consistent with certain disclosed embodiments.

FIG. 5*b* is a block diagram of an exemplary BS 430, consistent with certain disclosed embodiments. As shown in FIG. 5*b*, each BS 430 may include one or more of the following components: at least one central processing unit (CPU) 431 configured to execute computer program instructions to perform various processes and methods, random access memory (RAM) 432 and read only memory (ROM) 433 configured to access and store information and computer program instructions, memory 434 to store data and information, databases 435 to store tables, lists, or other data structures, I/O devices 436, interfaces 437, antennas 438, etc. Each of these components is well-known in the art and will not be discussed further.

RS 440 may be any type of computing device configured to wirelessly transmit 4 and/or receive data to and from BS 430, one or more other RSs 440, and/or one or more SSs 450 in wireless communication system 400, many of which are known in the art. Communication between RS 440 and BS 430, one or more other RSs 440, and one or more SSs 450 may be wireless. In one exemplary embodiment, RS 440 may have a broadcast/reception range within which RS 440 may wirelessly communicate with BS 430, one or more other RSs 440, and/or one or more SSs 450. Broadcast ranges may vary due to power levels, location, and interference (e.g., physical, electrical, etc.).

Figure 5C:
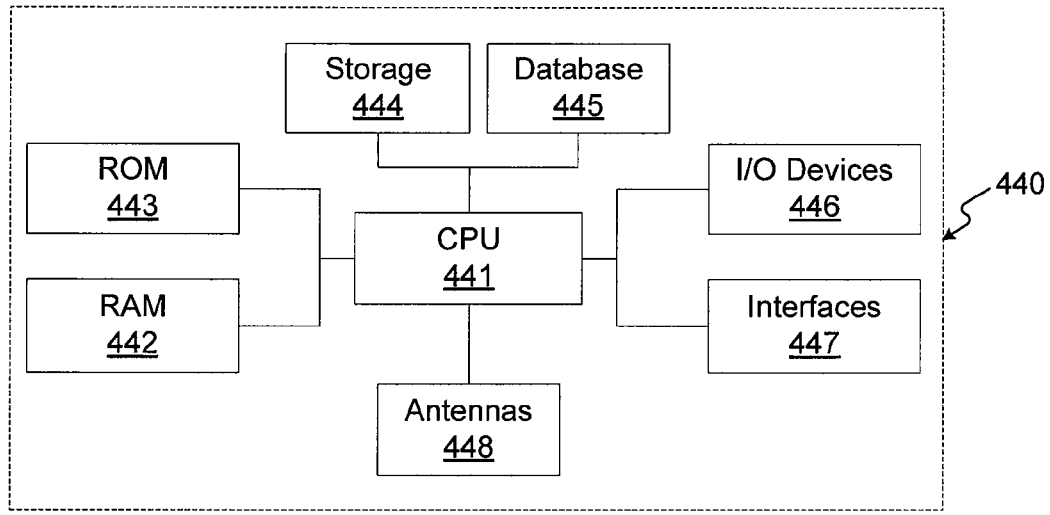
FIG. 5c is a block diagram of an exemplary relay station (RS), consistent with certain disclosed embodiments.

FIG. 5*c* is a block diagram of an exemplary RS 440, consistent with certain disclosed embodiments. As shown in FIG. 5*c*, each RS 440 may include one or more of the following components: at least one central processing unit (CPU) 441 configured to execute computer program instructions to perform various processes and methods, random access memory (RAM) 442 and read only memory (ROM) 443 configured to access and store information and computer program instructions, memory 444 to store data and information, databases 445 to store tables, lists, or other data structures, I/O devices 446, interfaces 447, antennas 448, etc. Each of these components is well-known in the art and will not be discussed further.

SS 450 may be any type of computing device configured to wirelessly transmit and/or receive data to and from BS 430 and/or one or more RSs 440 in wireless communication system 400. SS 450 may include, for example, servers, clients, desktop computers, laptop computers, network computers, workstations, personal digital assistants (PDA), tablet PCs, scanners, telephony devices, pagers, cameras, musical devices, etc. In addition, SS 450 may include one or more wireless sensors in a wireless sensor network configured to communicate by means of centralized and/or distributed communication. In one exemplary embodiment, SS 450 may be a mobile computing device. In another exemplary embodiment, SS 450 may be a fixed computing device operating in a mobile environment, such as, for example, a bus, a train, an airplane, a boat, a car, etc.

Figure 5D:
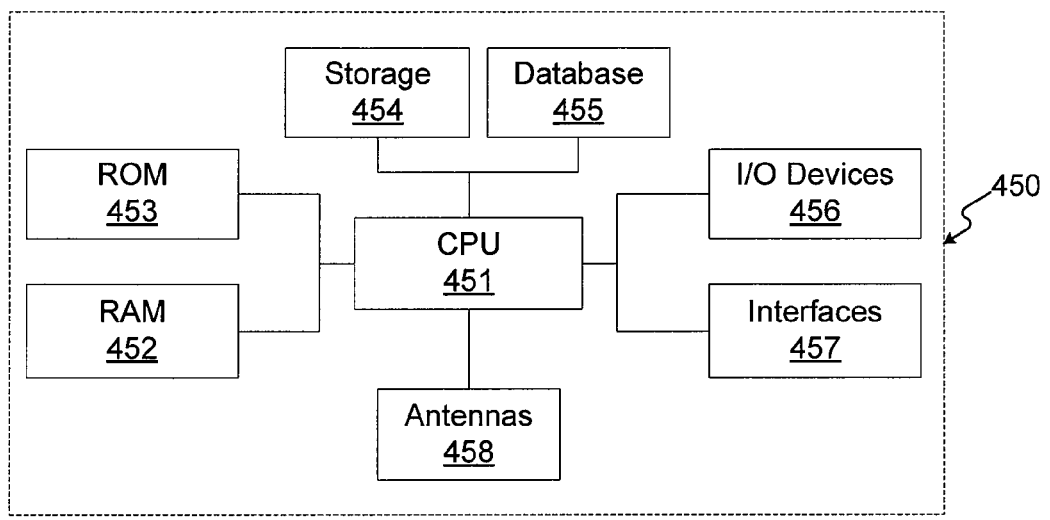
FIG. 5d is a block diagram of an exemplary subscriber station (SS), consistent with certain disclosed embodiments.

FIG. 5*d* is a block diagram of an exemplary SS 450, consistent with certain disclosed embodiments. As shown in FIG. 5*d*, each SS 450 may include one or more of the following components: at least one central processing unit (CPU) 451 configured to execute computer program instructions to perform various processes and methods, random access memory (RAM) 452 and read only memory (ROM) 453 configured to access and store information and computer program instructions, memory 454 to store data and information, databases 455 to store tables, lists, or other data structures, I/O devices 456, interfaces 457, antennas 458, etc. Each of these components is well-known in the art and will not be discussed further.

In addition, each node in wireless communication system 400 (e.g., BS 430, RSs 440*a*, 440*b*, and 440*c*, and SSs 450*a*, 450*b*, 450*c*, and 450*d*) may include one or more timers, referred to herein as "relay retransmission timers." In one exemplary embodiment, the relay retransmission timers may reflect a lifetime value of the data. Each of the one or more relay retransmission timers may be comprised of any combination of hardware and/or software. In addition, each of the one or more relay retransmission timers may include mechanisms by which the relay retransmission timer may be correlated with the transmission of data. That is, each relay retransmission timer may be set based on a determined round-trip time to a specified destination node (e.g., SS 450*a*, SS 450*b*, SS 450*c*, SS 450*d*, etc.).

For example, a relay retransmission timer for RS 440*a* may be set with a time that takes into account the total transmission time for the round-trip transmission path including RS 440*a*, RS 440*b*, RS 440*c*, and SS 450*a*. Similarly, a relay retransmission timer for RS 440*b* may be set with a time that takes into account the total transmission time for the round-trip transmission path including RS 440*b*, RS 440*c*, and SS 450*a*, and a relay retransmission timer for access RS 440*c* may be set with a time that takes into account the total round-trip transmission time for the transmission path including access RS 440c and SS 450a. In addition to the round-trip transmission time, the total transmission time may also include one or more timing offsets such as, for example, timing offsets for data processing, transmission node and receiving node transition gaps (e.g., Tx/Rx), additional local retransmission time, etc. In one exemplary embodiment, the total transmission time, $T_{total}$, may be defined by the following equation:

$$T_{total} = T_{Round\_Trip} + \Delta t, \quad \text{Equation 1}$$

wherein:

$T_{Round\_Trip}$ is the round-trip transmission time between the transmitting node and the destination node; and $\Delta t$ includes the one or more timing offsets.

In one exemplary embodiment, values associated with each relay retransmission timer may be determined during connection setup, and the value of the relay retransmission timer may be set accordingly. In other embodiments, values associated with each relay retransmission timer may be determined during network entry, when one or more transmission conditions is first determined, and/or when one or more transmission conditions changes. For example, upon entry of RS 440c to a network, such as wireless communication system 400, the component values associated with one or more of the relay retransmission timers of RS 440c (e.g., $T_{Round\_Trip}$, $\Delta t$, etc.) may be determined, and the total values of the one or more relay retransmission timers (e.g., $T_{total}$, etc.) may be set.

In the exemplary systems and methods disclosed herein, there may be three ARQ modes. The first ARQ mode is referred to herein as an end-to-end mode. That is, the ARQ transmission control mechanisms operate from one end of a transmission path (e.g., BS 430 or SS 450) to another end of the same transmission path (e.g., SS 450 or BS 430). The second ARQ mode is referred to herein as a two-segment ARQ mode. The two-segment ARQ mode is one in which the ARQ transmission control mechanisms operate between a "Relay ARQ segment," the segment between BS 430 and an access RS 440 (i.e., the RS 440 serving an SS 450 in a transmission path), and an "Access ARQ segment," the segment between the access RS 440 and the SS 450 it services. The third ARQ mode is referred to herein as hop-by-hop ARQ. Hop-by-hop ARQ transmission control mechanisms are those which operate between two adjacent nodes in a transmission path. For example, referring to FIG. 4, hop-by-hop ARQ would operate between BS 430 and RS 440a, between RS 440a and RS 440b, between RS 440b and RS 440c, and between RS 440c and SS 450a.

In some embodiments, the two-segment ARQ mode may be applicable in both tunnel and non-tunnel based forwarding. Hop-by-hop ARQ mode may be applicable in non-tunnel based forwarding, and may be supported when RS 440 operates using distributed resource allocation. Configuration of RS 440 for a particular ARQ mode is performed during RS 440 network entry.

Figure 6:
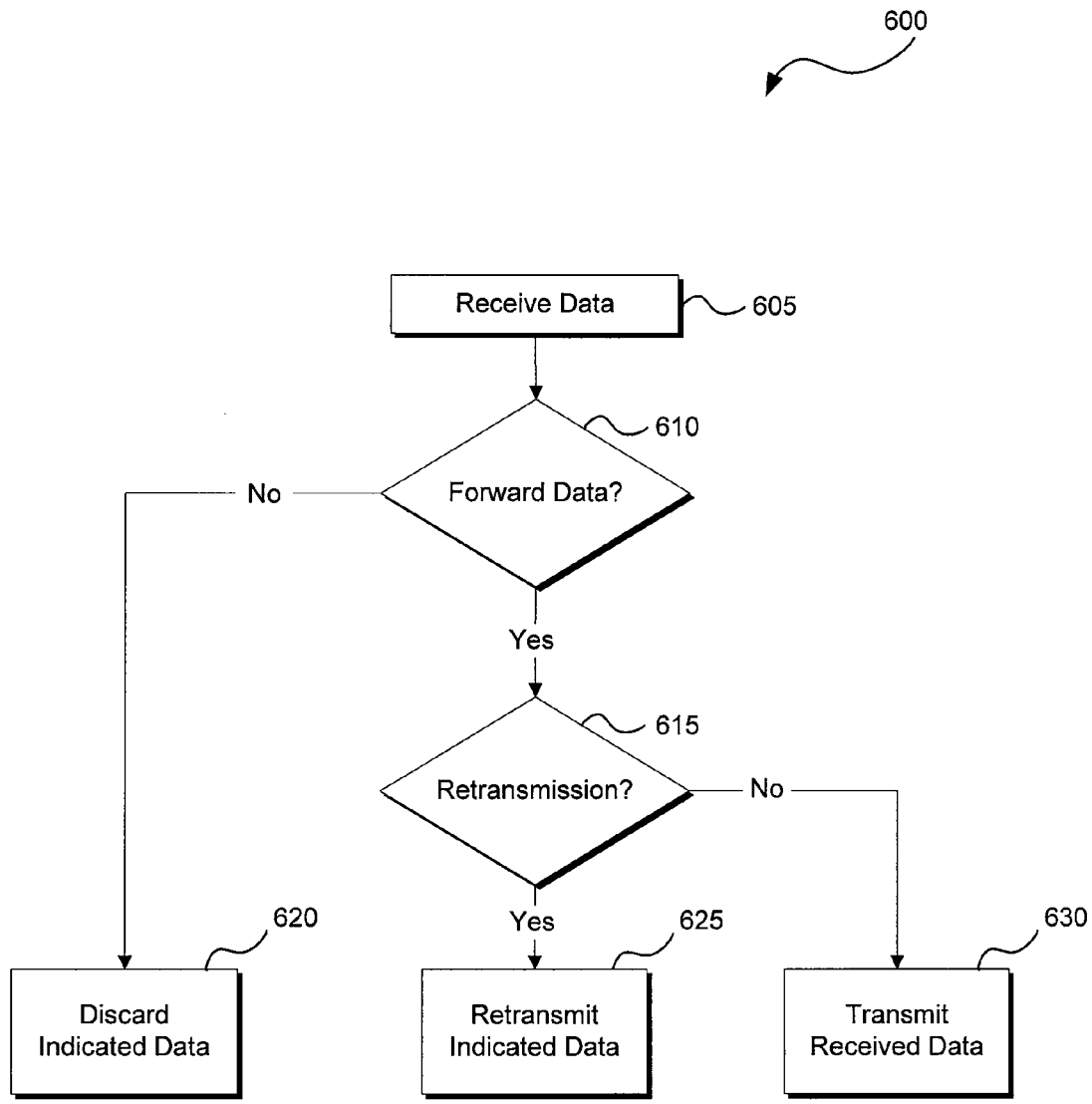
FIG. 6 is a flowchart illustrating an exemplary packet data processing, consistent with certain disclosed embodiments.

FIG. 6 discloses an exemplary flowchart 600 for data processing in a wireless communication system, such as exemplary wireless communication system 400, consistent with certain disclosed embodiments. Specifically, FIG. 6 illustrates the processing of packet data by any RS 440 received from a super ordinate RS 440 or BS 430, and sent to a subordinate RS 440 or SS 450. As used herein, the terms "subordinate" and "super ordinate" are used to describe the relative position of one node to another. A subordinate node is one that is positioned in the downlink stream between the node under discussion and a receiving node SS 450. A super ordinate node is one that is positioned in the uplink stream between the node under discussion and BS 430.

As shown in FIG. 6, RS 440 may receive packet data from BS 430 or a super ordinate RS 440 (step 605). Using control information, including packet data header information in the received packet data and/or MAP Information Element (IE) sent separately, RS 440 may determine if the received packet data is to be forwarded to access RS 440 (e.g., RS 440c) or SS 450 (step 610). If the packet data is not to be forwarded to access RS 440 (e.g., RS 440c) or SS 450 (step 610, No), RS 440 may process and discard the indicated packet data (step 620). In one exemplary embodiment, the indicated packet data may be packet data contained in the received data packet. Alternatively and/or additionally, the indicated packet data may be data sent in a prior or subsequent data packet.

If, however, the packet data is to be forwarded to access RS 440 (e.g., RS 440c) or SS 450 (step 610, Yes), RS 440 may determine if the received data includes one or more retransmitted data packets (step 615). Retransmitted data packets may refer to data packets that were previously transmitted to RS 440, but require retransmission due to transmission failure or error. Retransmitted packet data may be included in data packets containing new data, or may be sent in data packets including only the retransmitted data. In one exemplary embodiment, retransmitted packet data may be an indicator or identifier of data that was previously received by RS 440 and stored in a buffer of RS 440. RS 440 may use the resource allocation information previously sent by a control station, e.g., BS 430 or a super ordinate RS 440, to determine if the packet data is a transmission or retransmission. Here, if a single retransmitted packet data is included in the data packet, RS 440 will determine that the received data includes a data retransmission.

If RS 440 determines that the received data includes one or more retransmitted data packets (step 615, Yes), RS 440 may retransmit the indicated packet data, along with any new data packets in the received data, to access RS 440 (e.g., RS 440c) or SS 450 (step 625). In one exemplary embodiment, RS 440 may retrieve the packet data to be retransmitted from its buffer and retransmit the packet data using the resources allocated for the data retransmission. If the packet data is retransmission data, RS 440 may receive only control data from the BS 430 or super ordinate RS 440. That is, the received data may contain only traffic and/or application data, and no user data. If the packet data does not include retransmission data (step 615, No), RS 440 may transmit the received packet data, including control information and/or user data, to access RS 440 (e.g., RS 440c) or SS 450 (step 630).

Although not shown in FIG. 6, if RS 440 is configured with relay retransmission timers, upon transmission (step 630) and/or retransmission (step 625), RS 440 may set a relay retransmission timer with a value reflecting the total round-trip transmission time, $T_{total}$, between RS 440 and the destination node (i.e., SS 450) identified by the data.

Figure 7:
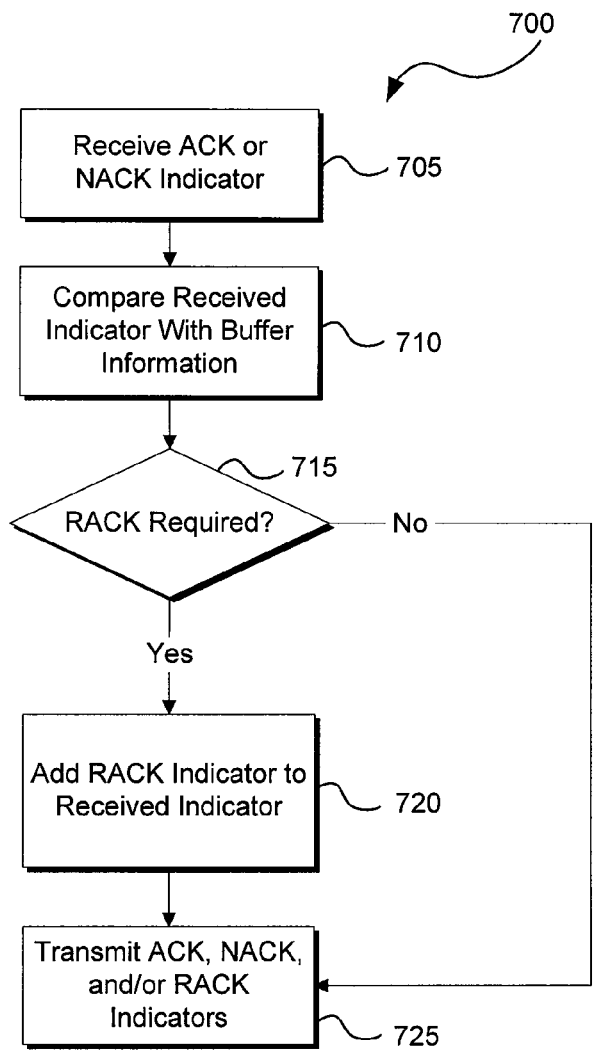
FIG. 7 is a flowchart illustrating an exemplary error detection and correction, consistent with certain disclosed embodiments.

FIG. 7 discloses an exemplary flowchart 700 for data processing in a wireless communication system, such as exemplary wireless communication system 400, consistent with certain disclosed embodiments. Specifically, FIG. 7 illustrates the processing of ACK and NACK indicators that have been received from an SS 450 by RS 440 for transmission to a super ordinate RS 440 or BS 430.

As shown in FIG. 7, RS 440 may receive either an ACK or NACK indicator from access RS 440 (e.g., RS 440c) or SS 450 (step 705). The ACK or NACK indicators may be used to identify which of the data packets sent by BS 430 were successfully received by access RS 440 (e.g., RS 440c) or SS 450. For example, if BS 430 sends 8 packets of data (e.g., data packets 1-8), but access RS 440 (e.g., RS 440c) or SS 450a receives only 6 data packets (e.g., data packets 1, 3, 4, 5, 6, and 8), an ACK indicator may be used to identify which of the 8 data packets were successfully received (e.g., data packets 1, 3, 4, 5, 6, and 8) and/or which of the 8 data packets was not successfully received (e.g., data packets 2 and 7). Identification of the packet data successfully received by RS 440 may be done directly and/or indirectly. That is, the ACK and/or NACK indicators may, for example, identify the received packet data directly by identifying the received and/or unreceived packet data, or indirectly by providing information from which the identity of the successfully received packet data can be derived.

After receiving the ACK or NACK indicator, RS 440 may compare the information contained in the ACK or NACK indicator with buffer status information (step 710). In one exemplary embodiment, RS 440 may compare the ACK or NACK indicator information with buffer information to identify the packet data received by the destination node (i.e., SS 450*a*). Based on the comparison, RS 440 may determine if a RACK indicator is required (step 715). If a RACK indicator is not required (step 715, No), RS 440 may transmit the received ACK or NACK indicator to a super ordinate RS 440 or BS 430.

If, however, a RACK indicator is required (step 715, Yes), RS 440 may modify the received indicator to include a RACK indicator (step 720). For example, RS 440 may include a RACK indicator with the received ACK or NACK indicator, and transmit the ACK or NACK indicator and included RACK indicator to a super ordinate RS 440 or BS 430 (step 725). Alternatively and/or additionally, RS 440 may modify the header information to identify the packet data successfully received by RS 440 from a super ordinate BS 430 or RS 440 and transmitted to SS 450.

Figure 8:
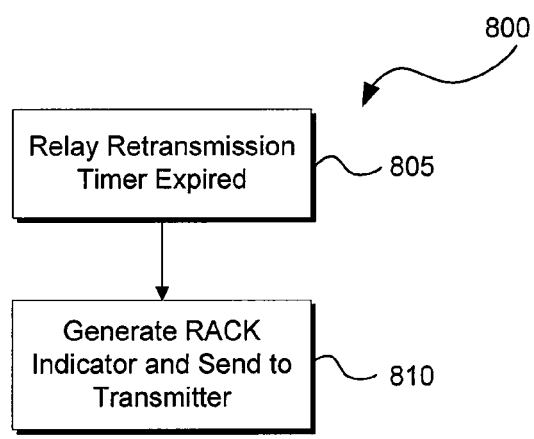
FIG. 8 is a flowchart illustrating an exemplary error detection and correction, consistent with certain disclosed embodiments.

FIG. 8 discloses an exemplary flowchart 800 for data processing in a wireless communication system, such as exemplary wireless communication system 400, consistent with certain disclosed embodiments. Specifically, FIG. 8 illustrates the generation of RACK indicators by RS 440 when an ACK or NACK indicator is not received by RS 440 before the expiration of an associated relay retransmission timer.

As shown in FIG. 8, if the relay retransmission timer expires before RS 440 receives an ACK or NACK indicator (step 805), RS 440 may automatically generate a RACK indicator, and send the generated RACK indicator to a super ordinate RS 440 or BS 430 (step 810). When RS 440 automatically generates a RACK indicator without having received an ACK or NACK indicator from SS 450, the information forwarded to a super ordinate RS 440 or BS 430 may not include an ACK or NACK indicator. Instead, the information will only include the RACK information for that RS 440.

Figure 9:
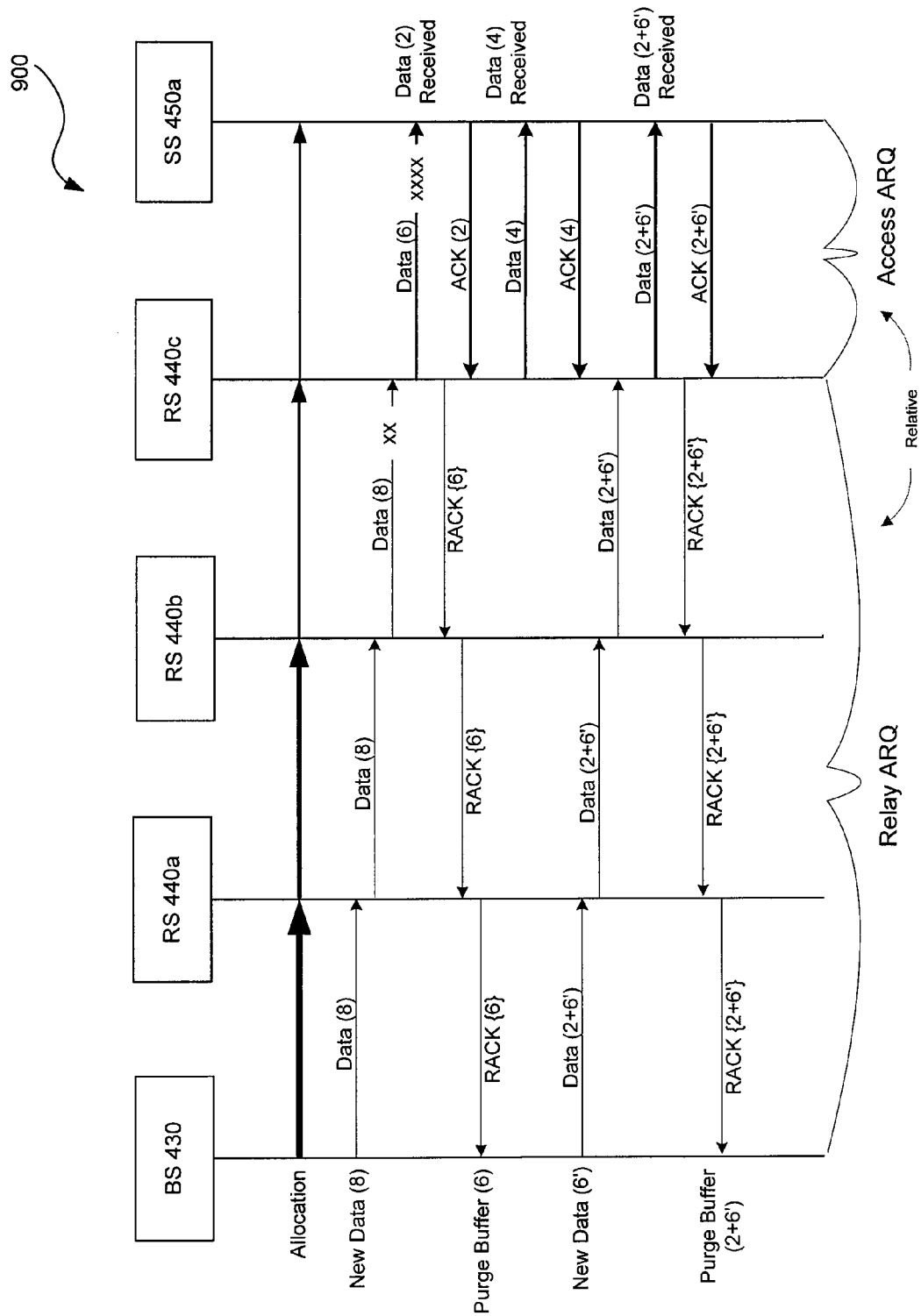
FIG. 9 is an exemplary signaling diagram of two-segment error detection and correction, consistent with certain disclosed embodiments.

FIG. 9 is a signaling diagram 900 illustrating one exemplary embodiment of an error detection and correction mechanism, consistent with certain disclosed embodiments. Specifically, FIG. 9 discloses an implementation of two-segment ARQ in which communication occurs in two segments: between the transmitter (e.g., BS 430) and the access node (e.g., RS 440*c*) and between the access node (e.g., RS 440*c*) and the subscriber device (e.g., SS 450*a*). In FIG. 9, RACK indicators may be transmitted in the Relay ARQ segment of the transmission path (i.e., between the transmitter and the access node), and ACK and/or NACK indicators may be transmitted in the Access ARQ segment of the transmission path (i.e., between the access node and the receiving device). More specifically, in FIG. 9, ACK and/or NACK indicators may be sent from SS 450*a* to BS 430, while RACK indicators may be sent from RS 440*c* to BS 430. In addition, in a system employing the signaling mechanisms illustrated by FIG. 9, resource allocation may be performed using distributed or centralized resource allocation.

As shown in FIG. 9, BS 430 may transmit control information to all nodes in a given transmission path, e.g., RS 440*a*, RS 440*b*, RS 440*c*, and SS 450*a*, to perform resource allocation (i.e., centralized resource allocation). After the resource allocation has been completed, BS 430 may send packet data to the destination node, e.g., RS 440*c* or SS 450*a*, via one or more intermediate nodes, e.g., RS 440*a*, RS 440*b*, and RS 440*c*. In addition, BS 430 may store a copy of the sent packet data in a buffer. In the example of FIG. 9, the packet data consists of 8 data packets (i.e., Data (8)).

RS 440*a* may successfully receive Data (8), store a copy of the packet data in its buffer, and send the packet data to RS 440*b*. Similarly, RS 440*b* may successfully receive Data (8), store a copy of the packet data in its buffer, and send the packet data to RS 440*c*. During transmission from RS 440*b* to RS 440*c*, however, 2 packets of data may be lost due to corruption, interference, error, etc., and RS 440*c* may receive only 6 packets of data (i.e., Data (6)). Upon receipt of Data (6), RS 440*c* may generate a RACK indicator (i.e., RACK {6}), and send the generated RACK indicator to its super ordinate node, RS 440*b*. The generated RACK indicator may identify which of the 8 data packets sent by BS 430 were successfully received by RS 440*c*. RACK {6} may be forwarded along the uplink transmission path from RS 440*b* to RS 440*a* and then to BS 430.

In addition to generating and sending the RACK indicator, RS 440*c* may also forward the received packet data (i.e., Data (6)) to SS 450*a*. Between RS 440*c* and SS 450*a*, however, another 4 packets of data may be lost, resulting in only 2 packets of data being successfully received by SS 450*a* (i.e., Data (2)). Upon receipt of Data (2), SS 450*a* may generate and send an ACK indicator (i.e., ACK (2)) to RS 440*c*, identifying the 2 packets of data that were successfully received. As discussed above in connection with FIG. 6, RS 440*c* may compare the information included with the ACK indicator with the data previously stored in its buffer. Based on the comparison, RS 440*c* may retransmit to SS 450*a* any data that was not successfully received by SS 450*a*. For example, as shown in FIG. 9, RS 440*c* may retransmit the 4 packets of data lost between RS 440*c* and SS 450*a*. As also shown in FIG. 9, SS 450*a* may successfully receive the 4 packets of data. Therefore, SS 450*a* may generate and send an ACK indicator (i.e., ACK (4)) to RS 440*c* indicating its successful receipt of the data.

While RS 440*c* is retransmitting any packet data lost between RS 440*c* and SS 450*a*, BS 430 may receive the RACK indicator (i.e., RACK {6}) sent from RS 440*c*. BS 430 may decode the RACK indicator to determine the transmission status of the packet data to RS 440*c*, and based on the decoding, BS 430 may purge from its buffer the packet data successfully received by RS 440*c*. BS 430 may prepare new packet data to transmit to SS 450*a* via RS 440*c*, and send the new packet data along with any packet data to be retransmitted to RS 440*c*. For example, BS 430 may purge the 6 data packets indicated in the RACK indicator as successfully received by RS 440*c*, and prepare 6' new data packets for transmission. In addition, BS 430 may re-allocate the resources along the transmission path.

Once the resources have been re-allocated, BS 430 may send the new and retransmitted data packets (i.e., Data (2+6')) to RS 440*a*. RS 440*a* may successfully receive Data (2+6'), store a copy of the packet data in its buffer, and send the packet data to RS 440*b*. Similarly, RS 440*b* may successfully receive Data (2+6'), store a copy of the packet data in its buffer, and send the packet data to RS 440c. Upon receipt of Data (2+6'), RS 440c may generate a RACK indicator (i.e., RACK {2+6'}), and send the generated RACK indicator to its super ordinate node, RS 440b. The generated RACK indicator may identify the 2+6' data packets sent by BS 430 and successfully received by RS 440c. The generated RACK indicator (i.e., RACK {2+6'}) may be forwarded along the uplink transmission path from RS 440b to RS 440a and then to BS 430.

In addition to generating and sending the RACK indicator, RS 440c may also forward the received packet data (i.e., Data (2+6')) to SS 450a. Upon receipt of the 2+6' packets of data, SS 450a may send an ACK indicator to RS 440c, identifying the 2+6' packets of data that were successfully received. As discussed above in connection with FIG. 6, RS 440c may compare the information included with the ACK indicator with the data previously stored in its buffer. Based on the comparison, RS 440c may retransmit to SS 450a any data that was not successfully received by SS 450a. As shown in FIG. 9, however, SS 450a successfully receives the 2+6' packets of data.

Although FIG. 9 illustrates the transmission of an ACK indicator from SS 450a, SS 450a may send any combination of ACK and/or NACK indicators. In any case, error detection and correction will proceed as discussed above. Further, while signaling diagram 900 illustrates the implementation of an exemplary embodiment using three RSs 440 in a single transmission path, it is anticipated that the number of RSs 440 in a transmission path may be greater or fewer than that illustrated. In addition, although not illustrated in FIG. 9, relay retransmission timers may be used during transmission of new data as well as during retransmission of data.

Figure 10:
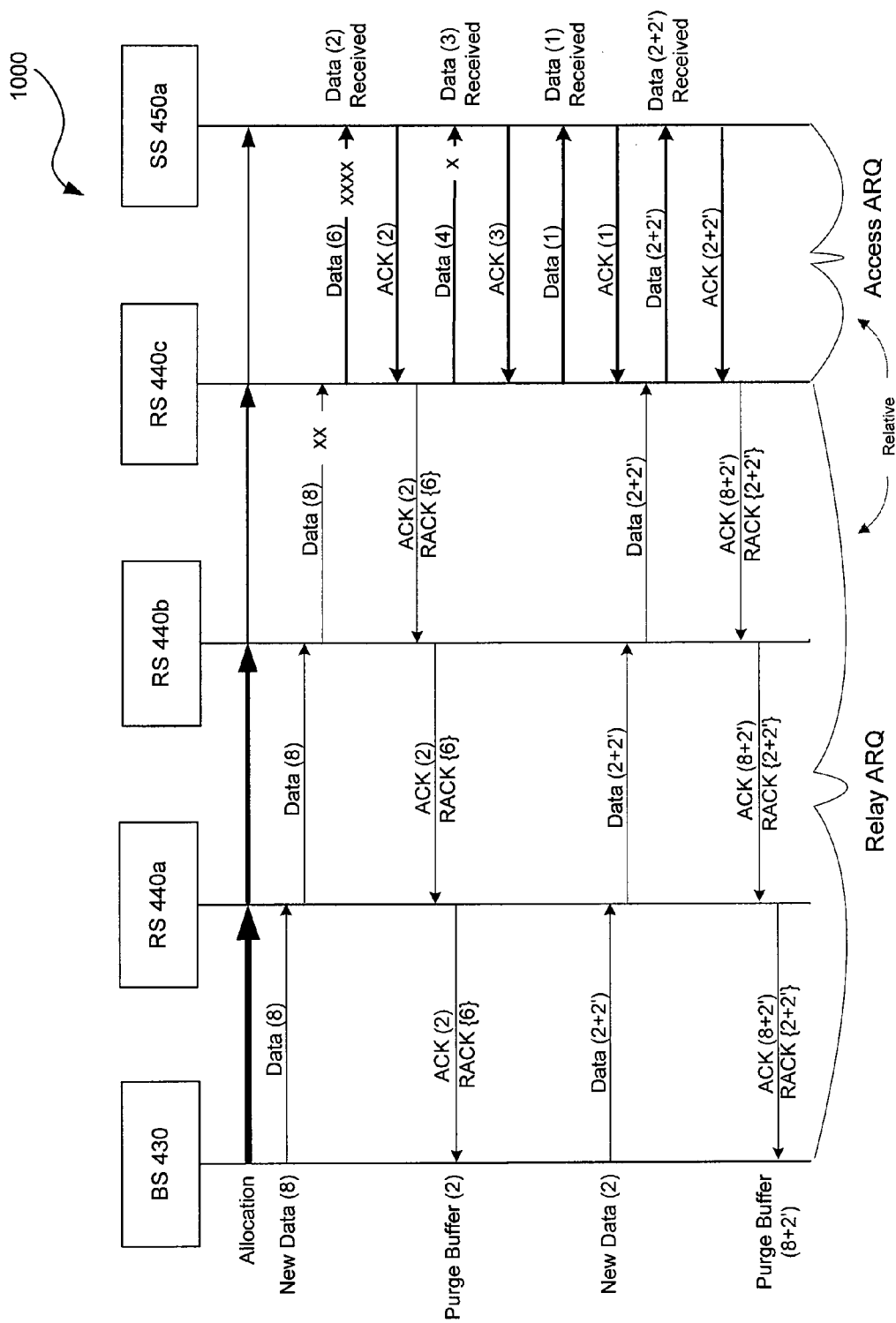
FIG. 10 is an exemplary signaling diagram of two-segment error detection and correction, consistent with certain disclosed embodiments.

FIG. 10 is a signaling diagram 1000 illustrating an exemplary embodiment of an error detection and correction mechanism, consistent with certain disclosed embodiments. Specifically, FIG. 10 discloses an implementation of two-segment ARQ in which communication occurs in two segments: between the transmitter (e.g., BS 430) and the access node (e.g., RS 440c), and between the access node (e.g., RS 440c) and the subscriber device (e.g., SS 450a). In FIG. 10, RACK indicators may be transmitted in the Relay ARQ segment of the transmission path (i.e., between the transmitter and the access node), and ACK and/or NACK indicators may be transmitted in the Access ARQ segment of the transmission path (i.e., between the access node and the receiving device). More specifically, in FIG. 10, ACK and/or NACK indicators may be sent from SS 450a to BS 430, while RACK indicators may be sent from RS 440c to BS 430. In addition, FIG. 10 illustrates a scenario in which RS 440c generates and sends a RACK indicator to BS 430 when RS 440c receives an ACK indicator from SS 450a.

In the signaling diagram of FIG. 10, resource allocation may proceed as discussed above in connection with FIG. 9. After the resource allocation has been completed, BS 430 may send packet data to the destination node, e.g., SS 450a, via one or more intermediate nodes, e.g., RS 440a, RS 440b, and RS 440c. In addition, BS 430 may store a copy of the sent packet data in a buffer. In the example of FIG. 10, the packet data consists of 8 data packets (i.e., Data (8)).

RS 440a may successfully receive Data (8), store a copy of the packet data in its buffer, and send the received packet data to RS 440b. Similarly, RS 440b may successfully receive Data (8), store a copy of the packet data in its buffer, and send the received packet data to RS 440c. During transmission from RS 440b to RS 440c, however, 2 packets of data may be lost due to corruption, interference, error, etc. Consequently, RS 440c may receive only 6 packets of data (i.e., Data (6)). After receiving Data (6), RS 440c may transmit Data (6) to SS 450a, and store a copy of the transmitted packet data in its buffer.

Between RS 440c and SS 450a another 4 packets of data may be lost, resulting in only 2 packets of data being successfully received by SS 450a (i.e., Data (2)). Upon receipt of Data (2), SS 450a may send an ACK indicator (i.e., ACK (2)) to RS 440c, identifying the packets of data that were successfully received. Upon receipt of the ACK indicator (i.e., ACK (2)), RS 440c may generate a RACK indicator (i.e., RACK {6}). The generated RACK indicator may identify which of the 8 data packets sent by BS 430 were successfully received by RS 440c. RS 440c may include the generated RACK indicator (i.e., RACK {6}) with the received ACK indicator (i.e., ACK (2)), and transmit both along the uplink transmission path from RS 440c to RS 440b, RS 440a, and then to BS 430.

In addition to generating and sending the RACK indicator, RS 440c may also attempt to retransmit any packet data lost between RS 440c and SS 450a. As discussed above in connection with FIG. 6, RS 440c may compare the information included in the ACK indicator with the packet data previously stored in its buffer. In some embodiments, RS 440c may compare the received ACK indicator information in association with the previously stored data to determine the quantity and/or identity of the data received by SS 450a. In other embodiments, RS 440c may simply check the received ACK indicator information.

Based on the comparison, RS 440c may retransmit to SS 450a any data that was not successfully received by SS 450a. For example, as shown in FIG. 10, RS 440c may retransmit the 4 packets of data lost between RS 440c and SS 450a (i.e., Data (4)). Here, however, SS 450a may receive only 3 of the 4 retransmitted data packets (i.e., Data (3)). Thus, SS 450a may generate and send an ACK indicator to RS 440c identifying the 3 retransmitted data packets that were successfully received (i.e., ACK (3)) by SS 450a. When RS 440c receives the ACK indicator (i.e., ACK (3)), RS 440c may compare the currently received ACK indicator information (i.e., ACK (3)) with the previously received ACK indicator information (i.e., ACK (2)) to obtain an ACK indicator that identifies the quantity and/or the identity of the data successfully received by SS 450a. In some embodiments, RS 440c may simply check the received ACK indicator information. In addition, RS 440c may retransmit the 1 packet of data lost between RS 440c and SS 450a (i.e., Data (1)).

Upon successful receipt of the 1 data packet (i.e., Data (1)), SS 450a may generate an ACK indicator (i.e., ACK (1)), and send the generated ACK indicator to RS 440c. RS 440c may compare the currently received ACK indicator information (i.e., ACK (1)) with the previously received ACK indicator information (i.e., ACK (5)) to obtain an updated ACK indicator that identifies the quantity and/or the identity of the data successfully received by SS 450a. In some embodiments, RS 440c may simply check the received ACK indicator information. In this example, the ACK indicator may identify the 6 data packets sent from RS 440c that have been successfully received by SS 450a.

While RS 440c is retransmitting any packet data lost between RS 440c and SS 450a, BS 430 may receive the ACK and RACK indicators sent from RS 440c. BS 430 may decode the ACK and RACK indicators to determine the transmission status of the packet data for both the Relay ARQ segments of the transmission path and the Access ARQ segment of the transmission path. Based on the decoding, BS 430 may purge from its buffer the packet data successfully received by SS 450a. BS 430 may prepare new packet data to transmit to SS 450a via RS 440c, and send the new packet data along with any packet data to be retransmitted to RS 440c. For example, BS 430 may purge the 2 data packets indicated in the ACK indicator as successfully received by SS 450a, and prepare 2' new data packets for transmission. Although not shown, the resources along the transmission path may be re-allocated, as discussed above in connection with FIG. 9.

Once the resources have been re-allocated, BS 430 may send the new and retransmitted data packets (i.e., Data (2+2')) to RS 440a. RS 440a may successfully receive Data (2+2'), store a copy of the packet data in its buffer, and send the packet data to RS 440b. Similarly, RS 440b may successfully receive Data (2+2'), store a copy of the packet data in its buffer, and send the packet data to RS 440c. Upon receipt of the 2+2' packets of data, RS 440c may forward the received packet data to SS 450a. Upon receipt of Data (2+2'), SS 450a may send an ACK indicator to RS 440c, identifying the 2+2' packets of data that were successfully received (i.e., ACK (2+2')). As discussed above in connection with FIG. 6, RS 440c may compare the information included with the ACK indicator (i.e., ACK (2+2')) with the data previously stored in its buffer. Based on the comparison, RS 440c may retransmit to SS 450a any data that was not successfully received by SS 450a. Here, SS 450a successfully receives Data (2+2'), and the ACK indicator may indicate such.

RS 440c may compare the currently received ACK indicator information (i.e., ACK (2+2')) with the previously received ACK indicator information to identify the quantity and/or the identity of the data successfully received by SS 450a (i.e., ACK (8+2')). In this example, the ACK indicator may identify the 8 original data packets and 2' new data packets successfully received by SS 450a. In addition, RS 440c may generate a RACK indicator (i.e., RACK {2+2'}), identifying the 2+2' data packets successfully received by RS 440c. The generated RACK indicator (i.e., RACK {2+2'}) may be included with the previously received ACK indicator (i.e., ACK (8+2')), and sent along the uplink transmission path from RS 440b to RS 440a and then to BS 430.

Although FIG. 10 illustrates the transmission of an ACK indicator from SS 450a, SS 450a may send any combination of ACK and/or NACK indicators. In any case, error detection and correction will proceed as discussed above. Further, while signaling diagram 1000 illustrates the implementation of an exemplary embodiment using three RSs 440 in a single transmission path, it is anticipated that the number of RSs 440 in a transmission path may be greater or fewer than that illustrated. In addition, although not illustrated in FIG. 10, relay retransmission timers may be used during transmission of new data as well as during retransmission of data.

Figure 11:
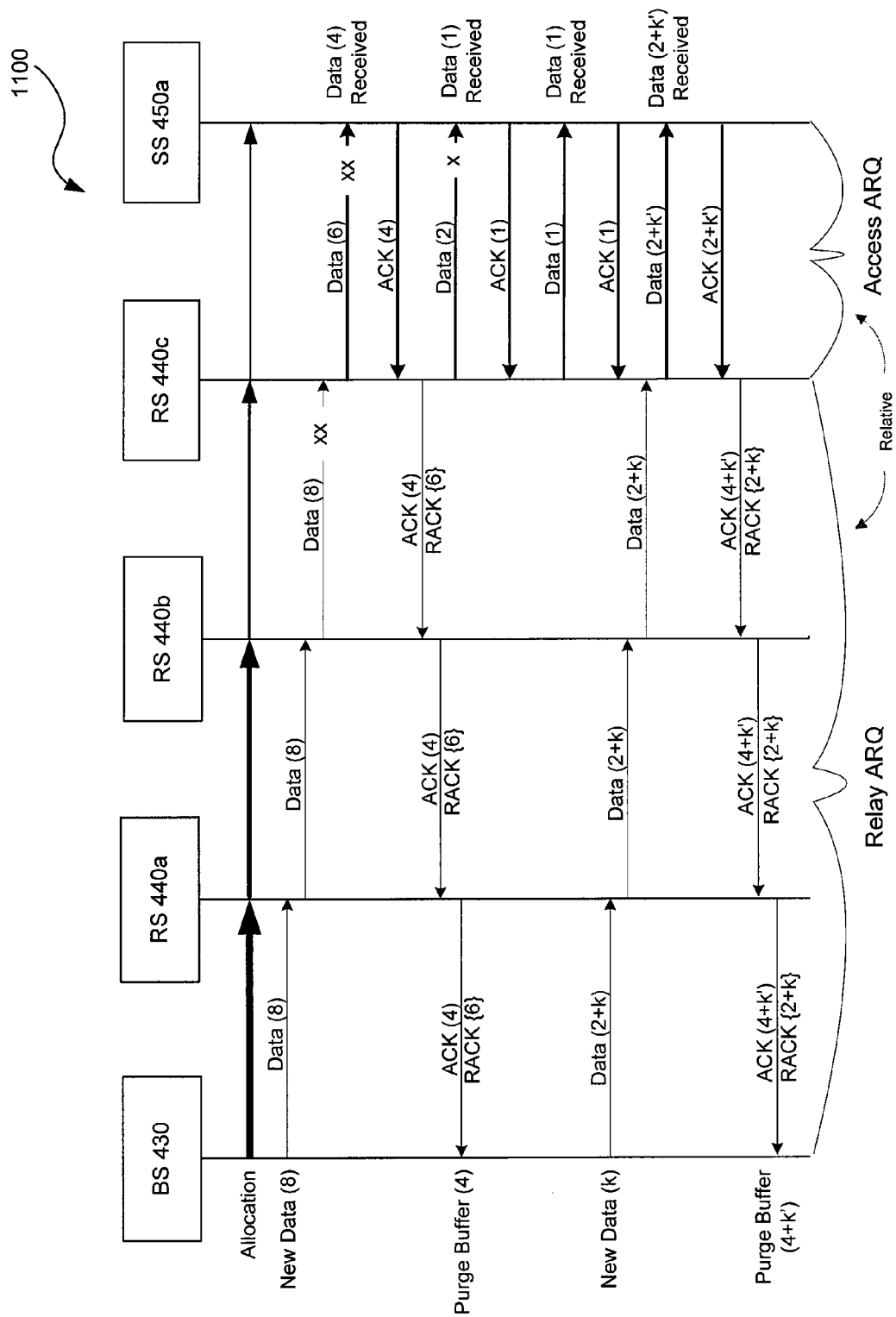
FIG. 11 is an exemplary signaling diagram of two-segment error detection and correction, consistent with certain disclosed embodiments.

FIG. 11 is a signaling diagram 1100 illustrating an exemplary embodiment of an error detection and correction mechanism, consistent with certain disclosed embodiments. Specifically, FIG. 11 discloses an implementation of two-segment ARQ in which communication occurs in two segments: between the transmitter (e.g., BS 430) and the access node (e.g., RS 440c), and between the access node (e.g., RS 440c) and the subscriber device (e.g., SS 450a). In FIG. 11, RACK indicators may be transmitted in the Relay ARQ segment of the transmission path (i.e., between the transmitter and the access node), and ACK and/or NACK indicators may be transmitted in the Access ARQ segment of the transmission path (i.e., between the access node and the receiving device). More specifically, in FIG. 11, ACK and/or NACK indicators may be sent from SS 450a to BS 430, while RACK indicators may be sent from RS 440c to BS 430.

In the signaling diagram of FIG. 11, resource allocation may proceed as discussed above in connection with FIG. 9. After the resource allocation has been completed, BS 430 may send packet data to the destination node, e.g., SS 450a, via one or more intermediate nodes, e.g., RS 440a, RS 440b, and RS 440c. In addition, BS 430 may store a copy of the sent packet data in a buffer. In the example of FIG. 11, the packet data may consist of 8 data packets (i.e., Data (8)).

RS 440a may successfully receive Data (8), store a copy of the packet data in its buffer, and send the packet data to RS 440b. Similarly, RS 440b may successfully receive Data (8), store a copy of the packet data in its buffer, and send the packet data to RS 440c. During transmission from RS 440b to RS 440c, however, 2 packets of data may be lost due to corruption, interference, error, etc. Consequently, RS 440c may receive only 6 packets of data (i.e., Data (6)). RS 440c may transmit Data (6) to SS 450a, and store a copy of the transmitted packet data in its buffer. Between RS 440c and SS 450a, however, another 2 packets of data may be lost, resulting in only 4 packets of data being successfully received by SS 450a (i.e., Data (4)). Thus, SS 450a may send an ACK indicator to RS 440c, identifying the 4 packets of data that were successfully received.

Upon receipt of the ACK indicator (i.e., ACK (4)), RS 440c may generate a RACK indicator (i.e., RACK {6}). The generated RACK indicator may identify which of the 8 data packets sent by BS 430 were successfully received by RS 440c. RS 440c may include RACK {6} with the received ACK indicator (i.e., ACK (4)), and transmit both along the uplink transmission path from RS 440c to RS 440b, RS 440a, and then to BS 430.

In addition to generating and sending the RACK indicator, RS 440c may also attempt to retransmit any packet data lost between RS 440c and SS 450a. As discussed above in connection with FIG. 6, RS 440c may compare the information included in the ACK indicator with the data previously stored in its buffer. Based on the comparison, RS 440c may retransmit any data that was not successfully received by SS 450a. For example, as shown in FIG. 11, RS 440c may retransmit the 2 packets of data lost between RS 440c and SS 450a (i.e., Data (2)). In this example, SS 450a may receive only 1 of the 2 retransmitted data packets (i.e., Data (1)). Therefore, SS 450a may generate and send an ACK indicator to RS 440c identifying which of the 2 retransmitted data packets were successfully received (i.e., ACK (1)).

When RS 440c receives the ACK indicator (i.e., ACK (1)), RS 440c may retransmit the 1 packet of data lost between RS 440c and SS 450a during the first retransmission (i.e., Data (1)). Upon successful receipt of the 1 data packet, SS 450a may generate an ACK indicator (i.e., ACK (1)), and send the generated ACK indicator to RS 440c. RS 440c may compare the currently received ACK indicator information (i.e., ACK (1)) with the previously received ACK indicator information (i.e., ACK (1)) to obtain an updated ACK indicator (i.e., ACK (2)). In this example, the updated ACK indicator may identify only the 2 data packets retransmitted to SS 440c.

While RS 440c is retransmitting packet data lost between RS 440c and SS 450a, BS 430 may receive the ACK and RACK indicators sent from RS 440c. BS 430 may decode the ACK and RACK indicators to determine the transmission status of the packet data for both the Relay ARQ segments of the transmission path and the Access ARQ segment of the transmission path. In this example, based on the decoding, BS 430 may purge from its buffer the packet data successfully received by SS 450a. BS 430 may prepare new packet data to transmit to SS 450a via RS 440c, and send the new packet data along with any packet data to be retransmitted to RS 440c. For example, BS 430 may purge the 4 data packets identified by ACK (4) as successfully received by SS 450a, and prepare "k" new data packets for transmission. Here, k may be any whole number. Although not shown, the resources along the transmission path may be re-allocated, as discussed above in connection with FIG. 9.

Once the resources have been re-allocated, BS 430 may send the new and retransmitted data packets (i.e., Data (2+k)) to RS 440*a*. RS 440*a* may successfully receive Data (2+k), store a copy of the packet data in its buffer, and send the packet data to RS 440*b*. Similarly, RS 440*b* may successfully receive Data (2+k), store a copy of the packet data in its buffer, and send the packet data to RS 440*c*. Upon receipt of Data (2+k), RS 440*c* may forward the new and retransmitted packet data (i.e., Data (2+k')) to SS 450*a*. Here, k' may be any whole number, and may refer to the new data transmitted between RS 440*c* and SS 450*a*. In some embodiments, k' may be the same as k. In other embodiments, k' may be different than k. In either case, RS 440*c* may determine the contents of k'.

Upon receipt of Data (2+k'), SS 450*a* may send an ACK indicator to RS 440*c*, identifying the packets of Data (2+k') that were successfully received (i.e., ACK (2+k')). As discussed above in connection with FIG. 6, RS 440*c* may compare the information included with the ACK indicator with the data previously stored in its buffer. Based on the comparison, RS 440*c* may retransmit to SS 450*a* any data that was not successfully received by SS 450*a*. As shown in FIG. 11, however, SS 450*a* successfully receives the 2+k' packets of data, and sends a corresponding ACK indicator (i.e., ACK (2+k')) to RS 440*c*. RS 440*c* may compare the currently received ACK indicator information (i.e., ACK (2+k')) with the previously received ACK indicator information (i.e., ACK (2) to obtain an updated ACK indicator that identifies the quantity and/or the identity of the data successfully received by SS 450*a* (i.e., ACK (4+k')). In this example, the ACK indicator may identify the 4 original data packets for which an ACK was not previously sent to BS 430, as well as the k' new data packets successfully received by SS 450*a*.

In addition, RS 440*c* may generate a RACK indicator (i.e., RACK {2+k'}), identifying the packets of Data (2+k') that were successfully received by RS 440*c*. The generated RACK indicator (i.e., RACK {2+k'}) may be included with the ACK indicator (i.e., ACK (4+k')), and sent along the uplink transmission path from RS 440*c* to RS 440*b*, RS 440*a*, and then to BS 430.

Although FIG. 11 illustrates the transmission of an ACK indicator from SS 450*a*, SS 450*a* may send any combination of ACK and/or NACK indicators. In any case, error detection and correction will proceed as discussed above. Further, while signaling diagram 1100 illustrates the implementation of an exemplary embodiment using three RSs 440 in a single transmission path, it is anticipated that the number of RSs 440 in a transmission path may be greater or fewer than that illustrated. In addition, although not illustrated in FIG. 11, relay retransmission timers may be used during transmission of new data as well as during retransmission of data.

Figure 12:
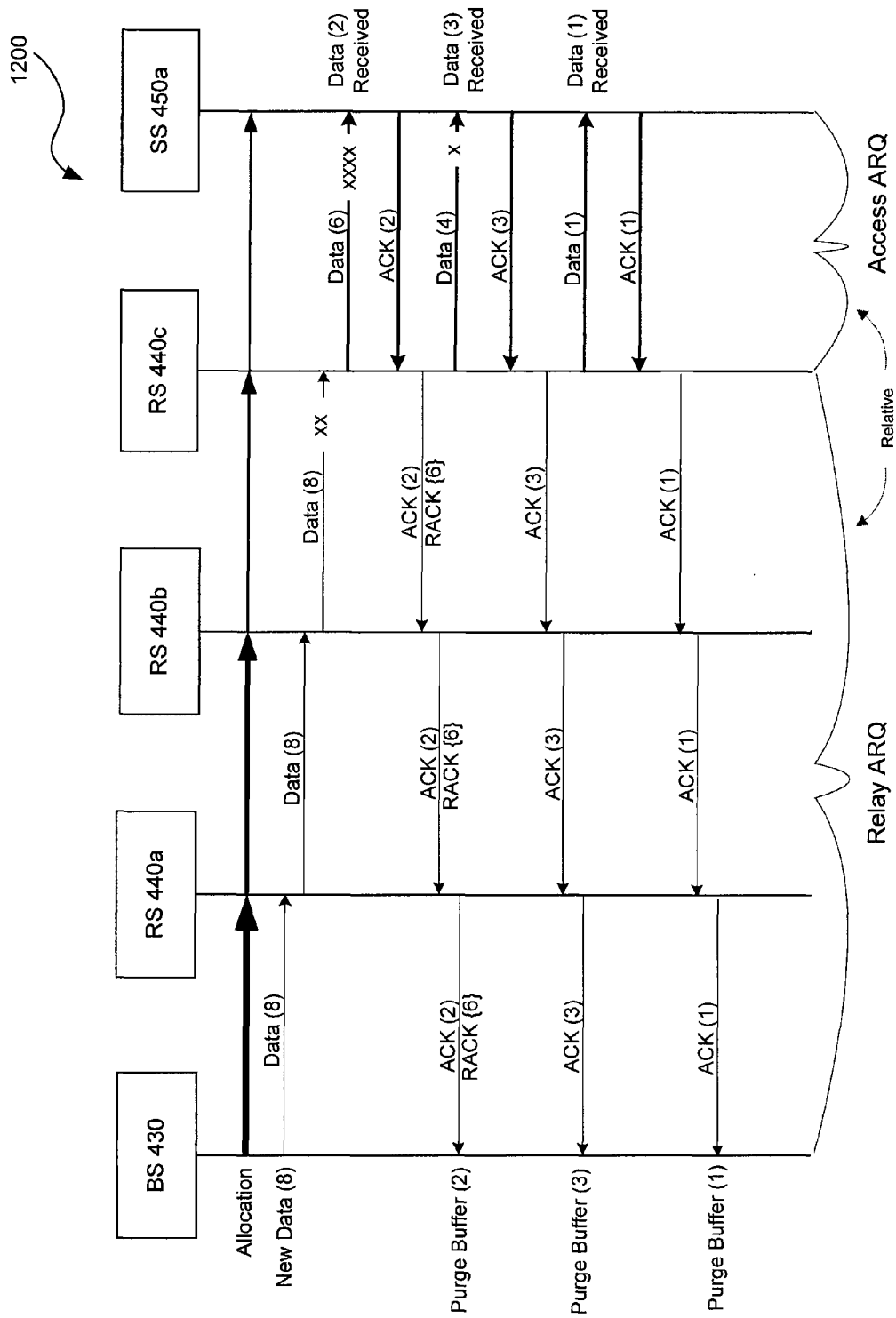
FIG. 12 is an exemplary signaling diagram of two-segment error detection and correction, consistent with certain disclosed embodiments.

FIG. 12 is a signaling diagram 1200 illustrating an exemplary embodiment of an error detection and correction mechanism, consistent with certain disclosed embodiments. Specifically, FIG. 12 discloses an implementation of two-segment ARQ in which communication occurs in two segments: between the transmitter (e.g., BS 430) and the access node (e.g., RS 440*c*), and between the access node (e.g., RS 440*c*) and the subscriber device (e.g., SS 450*a*). In FIG. 12, RACK indicators may be transmitted in the Relay ARQ segment of the transmission path (i.e., between the transmitter and the access node), and ACK and/or NACK indicators may be transmitted in the Access ARQ segment of the transmission path (i.e., between the access node and the receiving device). More specifically, in FIG. 12, ACK and/or NACK indicators may be sent from SS 450*a* to BS 430, while RACK indicators may be sent from RS 440*c* to BS 430. In the illustration of FIG. 12, once RS 440*c* generates and sends a RACK indicator to BS 430, any subsequently received ACK and/or NACK indicators may be relayed by RS 440*c* to BS 430.

In the signaling diagram of FIG. 12, resource allocation may proceed as discussed above in connection with FIG. 9. After the resource allocation has been completed, BS 430 may send packet data to the destination node, e.g., SS 450*a*, via one or more intermediate nodes, e.g., RS 440*a*, RS 440*b*, and RS 440*c*. In addition, BS 430 may store a copy of the sent packet data in a buffer. In the example of FIG. 12, the packet data may consist of 8 data packets (i.e., Data (8)).

RS 440*a* may successfully receive Data (8), store a copy of the packet data in its buffer, and send the packet data to RS 440*b*. Similarly, RS 440*b* may successfully receive Data (8), store a copy of the packet data in its buffer, and send the packet data to RS 440*c*. During transmission from RS 440*b* to RS 440*c*, however, 2 packets of data may be lost due to corruption, interference, error, etc. Consequently, RS 440*c* may receive only 6 packets of data (i.e., Data (6)). Therefore, RS 440*c* may only transmit Data (6) to SS 450*a*, and store a copy of the transmitted packet data in its buffer. Between RS 440*c* and SS 450*a* another 4 packets of data may be lost, resulting in only 2 packets of data being successfully received by SS 450*a* (i.e., Data (2)). Upon receipt of the 2 packets of data, SS 450*a* may send an ACK indicator to RS 440*c*, identifying the 2 packets of data that were successfully received. Upon receipt of the ACK indicator (i.e., ACK (2)), RS 440*c* may generate a RACK indicator (i.e., RACK {6}). The generated RACK indicator may identify which of the 8 data packets sent by BS 430 were successfully received by RS 440*c*. RS 440*c* may include the generated RACK indicator (i.e., RACK {6}) with the received ACK indicator (i.e., ACK (2)), and transmit both indicators along the uplink transmission path from RS 440*c* to RS 440*b*, RS 440*a*, and then to BS 430.

In addition to generating and sending the RACK indicator, RS 440*c* may also attempt to retransmit any packet data lost between RS 440*c* and SS 450*a*. As discussed above in connection with FIG. 6, RS 440*c* may compare the information included in the ACK indicator with the data previously stored in its buffer. Based on the comparison, RS 440*c* may retransmit to SS 450*a* any data that was not successfully received by SS 450*a*. For example, as shown in FIG. 12, RS 440*c* may retransmit the 4 packets of data lost between RS 440*c* and SS 450*a* (i.e., Data (4)). In this example, SS 450*a* may receive only 3 of the 4 retransmitted data packets (i.e., Data (3)). Thus, SS 450*a* may generate and send an ACK indicator to RS 440*c* identifying the 3 retransmitted data packets that were successfully received (i.e., ACK (3)). When RS 440*c* receives the ACK indicator (i.e., ACK (3)), RS 440*c* may forward the received ACK indicator along the uplink transmission path from RS 440*c* to RS 440*b*, RS 440*a*, and then to BS 430. In addition, RS 440*c* may retransmit the 1 packet of data lost between RS 440*c* and SS 450*a* (i.e., Data (1)). Upon successful receipt of the 1 data packet (i.e., Data (1)), SS 450*a* may generate an ACK indicator (i.e., ACK (1)), and send the generated ACK indicator to RS 440*c*. Again, when RS 440*c* receives the ACK indicator (i.e., ACK (1)), RS 440*c* may forward the received ACK indicator along the uplink transmission path from RS 440*c* to RS 440*b*, RS 440*a*, and then to BS 430. This may continue until RS 440*c* has successfully transmitted all of the data packets to SS 450*a*.

Although FIG. 12 illustrates the transmission of an ACK indicator from SS 450a, SS 450a may send any combination of ACK and/or NACK indicators. In any case, error detection and correction will proceed as discussed above. Further, while signaling diagram 1200 illustrates the implementation of an exemplary embodiment using three RSs 440 in a single transmission path, it is anticipated that the number of RSs 440 in a transmission path may be greater or fewer than that illustrated. In addition, although not illustrated in FIG. 12, relay retransmission timers may be used during transmission of new data as well as during retransmission of data. Furthermore, in some embodiments, RS 440c may generate and send a stand-alone ACK indicator to BS 430. A stand-alone ACK indicator may be an ACK indicator that is generated by the RS 440 (e.g., RS 440c). The stand-alone ACK indicator may be event-triggered (e.g., sent when one or more ACK and/or NACK indicators is received from SS 450a, etc.) or may be triggered periodically (e.g., sent at pre-determined periodic intervals, sent when a relay retransmission timer expires, sent when one or more other timers and/or timing events expire and/or are exceeded, etc.). In addition, in some embodiments, access RS 440 (e.g., RS 440c) may generate and send a standalone RACK indicator to BS 430. For example, if an ACK and/or NACK indicator is not received from SS 450a before a triggering event occurs, access RS 440 may generate and send a stand-alone RACK indicator. Examples of triggering events include: when an ACK indicator is received from SS 450a, when a pre-determined periodic interval is exceeded, when a relay retransmission timer expires, when one or more other timers and/or timing events expire and/or are exceeded, etc. In other embodiments, access RS 440 (e.g., RS 440c) may compare buffer status and, if access RS 440 receives one or more ACK indicators from SS 450 before any triggering event occurs, access RS 440 may generate and send a RACK indicator with the received one or more ACK indicators.

Figure 13:
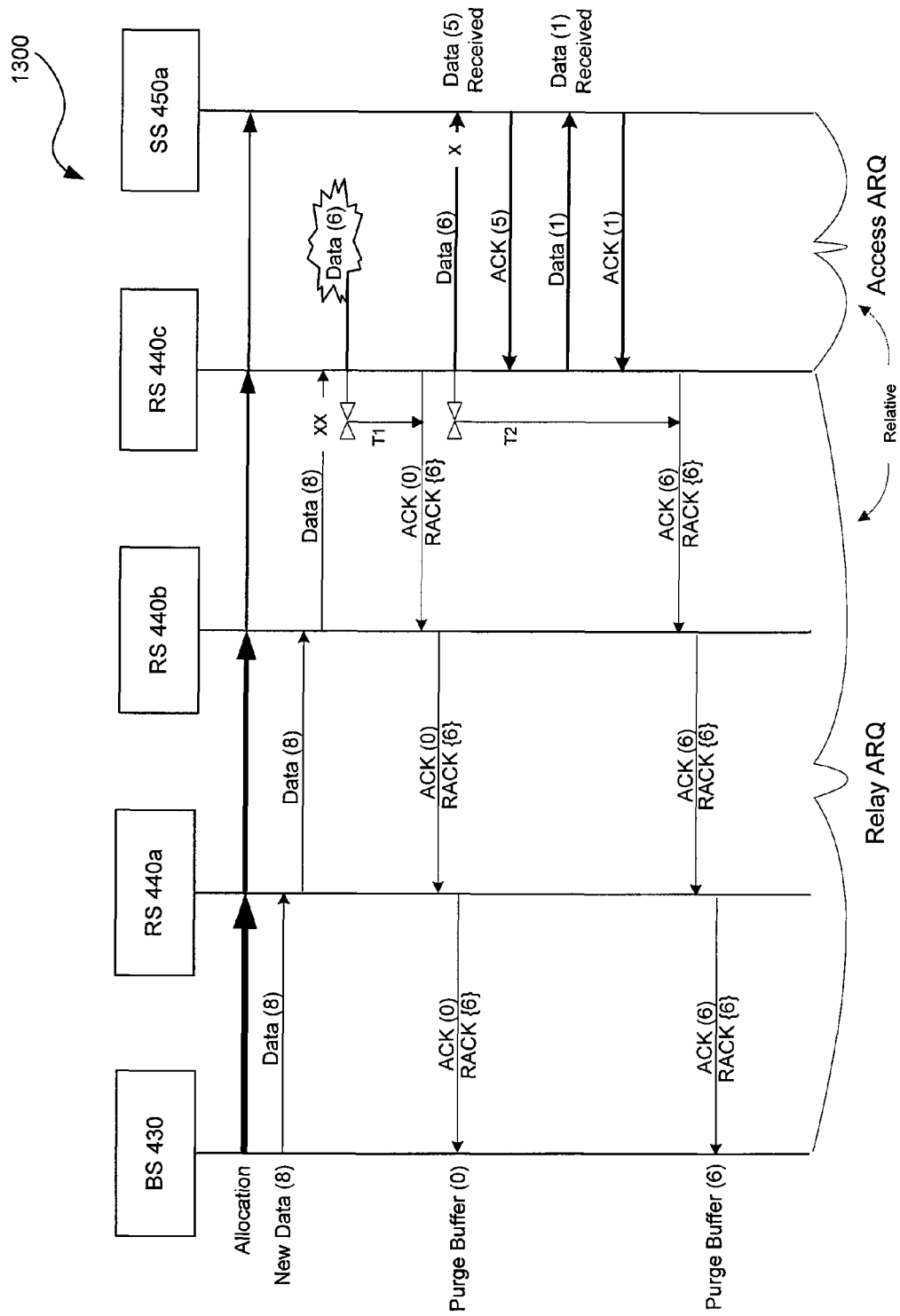
FIG. 13 is an exemplary signaling diagram of two-segment error detection and correction, consistent with certain disclosed embodiments.

FIG. 13 is a signaling diagram 1300 illustrating an exemplary embodiment of an error detection and correction mechanism, consistent with certain disclosed embodiments. Specifically, FIG. 13 discloses an implementation of two-segment ARQ in which communication occurs in two segments: between the transmitter (e.g., BS 430) and the access node (e.g., RS 440c), and between the access node (e.g., RS 440c) and the subscriber device (e.g., SS 450a). In FIG. 13, RACK indicators may be transmitted in the Relay ARQ segment of the transmission path (i.e., between the transmitter and the access node), and ACK and/or NACK indicators may be transmitted in the Access ARQ segment of the transmission path (i.e., between the access node and the receiving device). More specifically, in FIG. 13, ACK and/or NACK indicators are sent from SS 450a to BS 430, while RACK indicators are sent from RS 440c to BS 430. In addition, FIG. 13 illustrates an implementation in which RS 440c is configured to set a relay retransmission timer $T_n$ (e.g., $T_2$) for one or more local retransmissions between RS 440c and SS 450a. In this implementation, when $T_2$ expires or the local retransmission of data is completed, RS 440c may send one or more ACK and/or RACK indicators to BS 430 after verifying the buffer status.

In the signaling diagram of FIG. 13, resource allocation may proceed as discussed above in connection with FIG. 9. After the resource allocation has been completed, BS 430 may send packet data to the destination node, e.g., SS 450a, via one or more intermediate nodes, e.g., RS 440a, RS 440b, and RS 440c. In addition, BS 430 may store a copy of the sent packet data in a buffer. In the example of FIG. 13, the packet data consists of 8 data packets (i.e., Data (8)).

RS 440a may successfully receive Data (8), store a copy of the packet data in its buffer, and send the packet data to RS 440b. Similarly, RS 440b may successfully receive Data (8), store a copy of the packet data in its buffer, and send the packet data to RS 440c. During transmission from RS 440b to RS 440c, however, 2 packets of data may be lost due to corruption, interference, error, etc. Consequently, RS 440c may receive only 6 packets of data (i.e., Data (6)), and may generate and send to BS 430 a RACK indicator (i.e., RACK {6}), reflecting that 6 data packets were successfully received by RS 440c.

RS 440c may transmit Data (6) to SS 450a, and store a copy of the transmitted packet data in its buffer. Concurrently with the transmission of Data (6) to SS 450a, in one exemplary embodiment, RS 440c may set a relay retransmission timer $T_1$. As discussed above, the relay retransmission timer for each RS 440 may be set with a value reflecting the total round-trip time between that RS 440 and the destination node (e.g., SS 450a). Here, the relay retransmission timer $T_1$ may be set with a value reflecting the total round-trip time between RS 440c and SS 450a.

In the example of FIG. 13, Data (6) may be lost between RS 440c and SS 450a. Thus, SS 450a may not receive any data, and will not prepare and/or send an ACK or NACK indicator. Therefore, as discussed above in connection with FIG. 8, relay retransmission timer $T_1$ of RS 440c will expire without having received ACK and/or NACK indicators from SS 450a. Once relay retransmission timer $T_1$ expires, RS 440c may generate an ACK indicator (i.e., ACK (0)). The generated ACK indicator will reflect the fact that no data packets were acknowledged by SS 450a. The generated ACK and RACK indicators may be transmitted along the uplink transmission path from RS 440c to RS 440b, RS 440a, and then to BS 430. In one exemplary embodiment, the ACK and RACK indicators may be generated and/or sent at the same time. In another exemplary embodiment, the RACK indicator may be generated and sent upon successful receipt of the packet data by RS 440c, but the ACK indicator may be generated and sent when relay retransmission timer $T_1$ expires.

In addition to generating and sending the ACK and RACK indicators, RS 440c may also attempt retransmission of packet data lost between RS 440c and SS 450a. For example, as shown in FIG. 13, RS 440c may retransmit the 6 packets of data lost between RS 440c and SS 450a (i.e., Data (6)). In one exemplary embodiment, RS 440c may initiate a second relay retransmission timer $T_2$ concurrently with the first retransmission of the packet data to SS 450a. In another exemplary embodiment, the second relay retransmission timer $T_2$ may be initiated concurrently with the first relay retransmission timer $T_1$. Relay retransmission timer $T_2$ may be set with a value reflecting the total round-trip time between RS 440c and SS 450a.

In this example, SS 450a may receive only 5 of the 6 retransmitted data packets (i.e., Data (5)). Thus, SS 450a may generate and send an ACK indicator to RS 440c identifying the 5 retransmitted data packets were successfully received (i.e., ACK (5)). When RS 440c receives the ACK indicator (i.e., ACK (5)), RS 440c may retransmit the 1 packet of data lost between RS 440c and SS 450a (i.e., Data (1)). Upon successful receipt of the 1 data packet (i.e., Data (1)), SS 450a may generate an ACK indicator (i.e., ACK (1)), and send the generated ACK indicator to RS 440c. RS 440c may compare the currently received ACK indicator information (i.e., ACK (1)) with the previously received ACK indicator information (i.e., ACK (5)) to obtain an ACK indicator that identifies the quantity and/or the identity of the data successfully received by SS 450a (i.e., ACK (6)). In this example, the ACK indicator may identify the 6 data packets retransmitted from RS 440c that have been successfully received by SS 450a.

RS 440c may continue retransmitting data until relay retransmission timer $T_2$ expires. In some embodiments, a relay retransmission timer may be initiated for each retransmission of packet data. In other embodiments, a relay retransmission timer may be initiated which encompasses all the retransmission attempts associated with one set of initially transmitted data. In either case, once relay retransmission timer $T_2$ expires, RS 440c may transmit the ACK indicator (i.e., ACK (6)) and/or a copy of the previously transmitted RACK indicator (i.e., RACK (6)) along the upstream transmission path from RS 440c to RS 440b, RS 440a, and then to BS 430.

Although FIG. 13 illustrates the transmission of ACK indicators from SS 450a, SS 450a may send any combination of ACK and/or NACK indicators. In any case, error detection and correction will proceed as discussed above. Further, while signaling diagram 1300 illustrates the implementation of an exemplary embodiment using three RSs 440 in a single transmission path, it is anticipated that the number of RSs 440 in a transmission path may be greater or fewer than that illustrated. In addition, although not illustrated in FIG. 13, relay retransmission timers may be used during transmission of new data as well as during retransmission of data.

Figure 14:
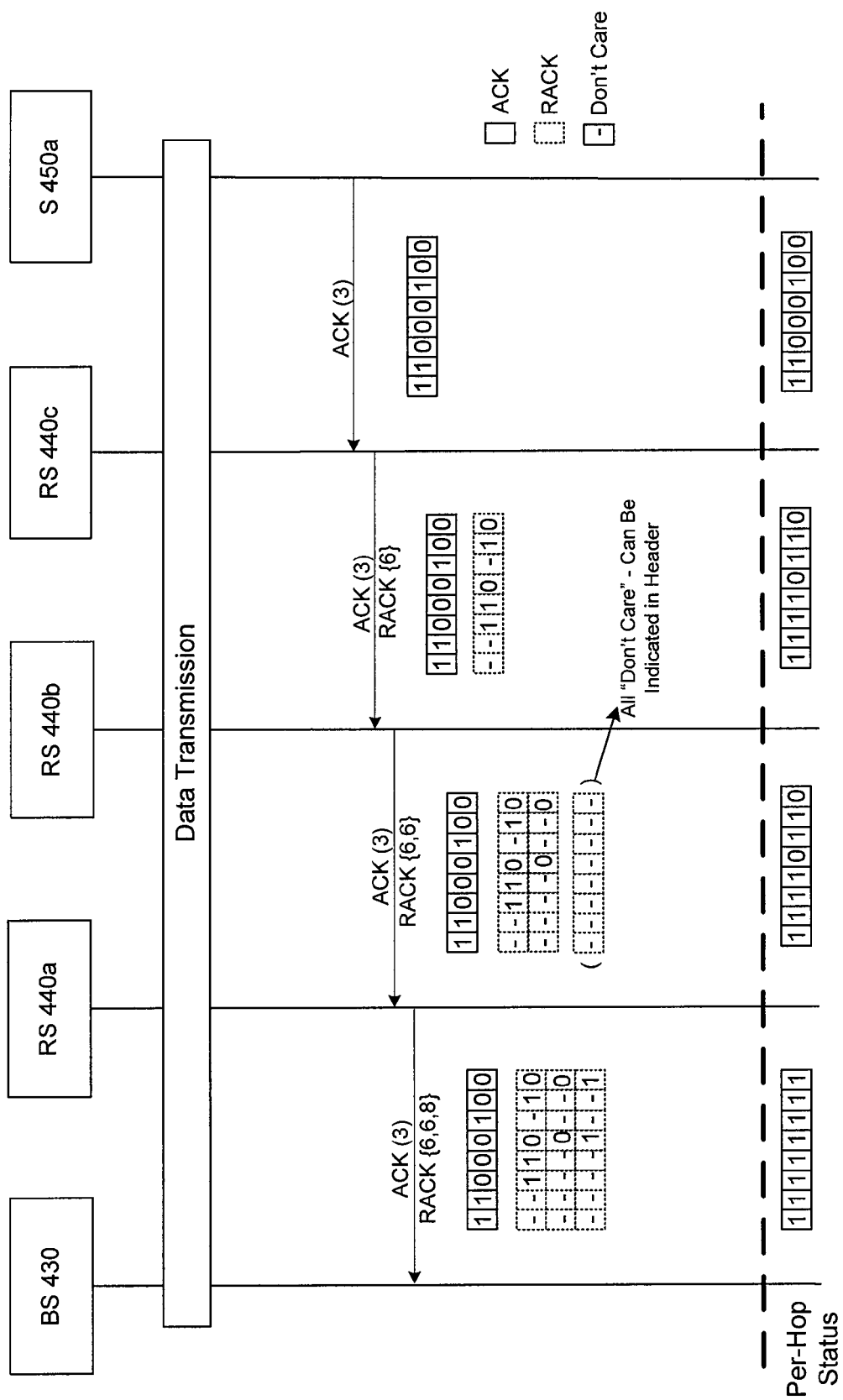
FIG. 14 is an exemplary signaling diagram illustrating an ACK indicator with RACK indicators, consistent with certain disclosed embodiments.

FIG. 14 is a signaling diagram illustrating exemplary ACK and RACK indicators, consistent with certain disclosed embodiments. As shown in FIG. 14, BS 430 sends 8 data packets to RS 440a, RS 440a successfully receives and sends 8 data packets to RS 440b, RS 440b successfully receives and sends the 6 data packets to RS 440c, and RS 440c successfully receives and sends the 6 data packets to SS 450a. However, SS 450a successfully receives only 3 data packets, and therefore prepares and sends an ACK indicator acknowledging successful receipt of 3 data packets.

In FIG. 14, the ACK indicator generated by SS 450a may include 8 data regions by which SS 450a can identify the 3 data packets successfully received. While the example of FIG. 14 uses data regions of a single bit, the data regions can be of any size or configuration. As shown in FIG. 14, SS 450 may generate an ACK indicator having a bit stream of "11000100." SS 450a may send the generated ACK indicator to RS 440c.

RS 440c may compare the information provided by the ACK indicator, i.e., the identity of the data packets successfully received by SS 450a, and compare the data packets successfully received by RS 440c with the data packets indicated as successfully received by SS 450a in the ACK indicator. RS 440c may generate a RACK indicator identifying the data packets successfully received by RS 440c but not reported in the ACK indicator. For the data successfully received by RS 440c and reported in the received ACK indicator, RS 440c may insert a "don't care" or "no additional information" indicator, e.g., "-", and include the generated RACK indicator with the received ACK indicator. As shown in FIG. 14, the RACK indicator generated by RS 440c may be "--110-10," and the bit stream of the ACK and RACK indicators would be "11000100" followed by "--110-10." In some embodiments, the addition of the RACK indicator to the ACK indicator may be indicated in the control part of the message, using, for example, a bit in the message header. RS 440c may send the ACK and included RACK indicator to RS 440b.

RS 440b may compare the information provided by the ACK indicator and included RACK indicator, i.e., the identity of the data packets successfully received by SS 450a and RS 440c, and compare the data successfully received by RS 440b with the data packets indicated as successfully received by SS 450a in the ACK indicator and RS 440c in the RACK indicator. RS 440b may generate a RACK indicator identifying the data packets successfully received by RS 440b but not reported in the ACK and/or RACK indicators. For the data successfully received by RS 440b and reported in the ACK and/or RACK indicators, RS 440b may insert a "don't care" or "no additional information" indicator, e.g., "-", and include the generated RACK indicator with the received ACK and RACK indicators. As shown in FIG. 14, the RACK indicator generated by RS 440b may be "----0--0," and the bit stream of the ACK and RACK indicators would be "11000100" followed by "--110-10" and "----0--0." As discussed above, in some embodiments, the addition of the RACK indicators to the ACK indicator may be indicated in the control part of the message, using, for example, a bit in the message header. In this example, RS 440b may indicate in the message header that all the bits for this RACK are "don't care." RS 440b may send the ACK indicator and included RACK indicators to RS 440a.

RS 440a may compare the information provided by the ACK and included RACK indicators, i.e., the identity of the data packets successfully received by SS 450a, RS 440c and RS 440b, and compare the data successfully received by RS 440a with the data packets indicated as successfully received by SS 450a in the ACK indicator and RS 440c and RS 440b in the RACK indicators. Based on the comparison, RS 440a may generate a RACK indicator identifying the data packets successfully received by RS 440a but not reported in the ACK and/or RACK indicators. For the data successfully received by RS 440a and reported in the ACK and/or RACK indicators, RS 440a may insert a "don't care" or "no additional information" indicator, e.g., "-", and include the generated RACK indicator with the received ACK and RACK indicators. As shown in FIG. 14, the RACK indicator generated by RS 440a may be "----1--1," and the bit stream of the ACK and RACK indicators would be "11000100" followed by "--110-10," "----0--0," and "----1--1." RS 440a may send the ACK and included RACK indicators to BS 430.

Figure 15:
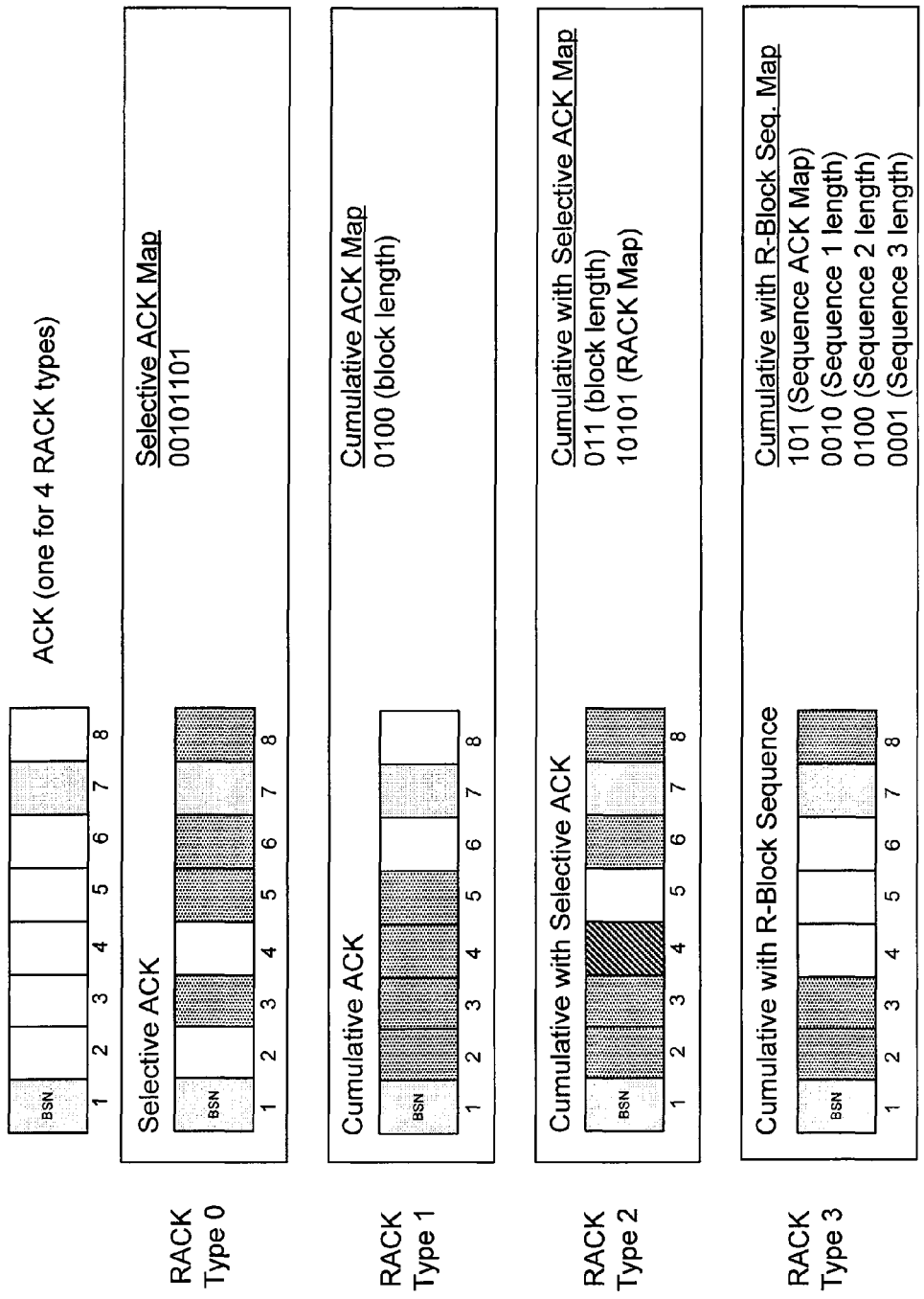
FIG. 15 is an exemplary block diagram illustrating RACK indicator types, consistent with certain disclosed embodiments.

FIG. 15 is a diagram illustrating the different RACK indicator types. As shown in FIG. 15, there may be four RACK types which may be used to represent one or more of the included RACK indicators. Generally, in the disclosed embodiments, each RS 440 treats the data indicated as received in the ACK indicator as "don't care," and reports only the data received by the intermediate or access nodes (i.e., RSs 440) along the transmission path. In the illustration of FIG. 15, the ACK indicator identifies data blocks 1 and 7 as having been successfully received by SS 450. Blocks 1 and 7 are illustrated in FIG. 15 by the solid gray coloring.

In RACK type 0, referred to herein as "Selective RACK Map," the Block Sequence Number (BSN) of the ACK is reused in the RACK indicator to conserve resources. Therefore, in this RACK type, there are only 4 data blocks to report in the RACK indicator, i.e., 3, 5, 6, and 8, as data blocks 1 and 7 are reported in the ACK indicator. Blocks 3, 5, 6, and 8 are illustrated by the dotted gray filling, blocks 1 and 7 are illustrated by the solid gray filling. As a result, using the type 0 Selective RACK Map for this hop or segment, beginning with the BSN, the RACK data stream is "00101101."

RACK type 1, referred to herein as "Cumulative RACK Map," may be used when there are continuous data blocks to report. In this example, there are 4 continuous data blocks to report in the RACK indicator, i.e., 2, 3, 4, and 5. Therefore, the data stream "0100" will be used to indicate that four data blocks are ACKed. Blocks 2, 3, 4, and 5 are illustrated by the dotted gray filling, blocks 1 and 7 are illustrated by the solid gray filling. The data stream will begin next to the BSN. As a result, using the type 1 Cumulative RACK Map for this segment, beginning with the BSN, the RACK data stream may be "00100000," using the first four bits to indicate that there are 4 continuous data blocks (i.e., "0010" followed by four other bits). Alternatively, using the type 1 Cumulative RACK Map for this segment, beginning with the BSN, the RACK data stream may be "00000100," using the last four bits to indicate that there are 4 continuous data blocks (i.e., "0010" preceded by four other bits).

RACK type 2, referred to herein as "Cumulative with Selective RACK Map," may be used when there are continuous data blocks with some separated data blocks. In this example, in addition to the data blocks 1 and 7 of the ACK, data blocks 2, 3, 4, 6, and 8 also need to be reported. Therefore, the data stream "0011" will be used in a Selective RACK Map to indicate data blocks 2-4. Data stream "10101," beginning from the last indicated block in the Selective RACK Map will be used to indicate data blocks 6 and 8. In other words, the first data block indicated by "1" in the type 2 Cumulative with Selective RACK Map identifies the last block indicated in the Selective RACK Map. Blocks 1 and 7 are illustrated in FIG. 15 by the solid gray filling, blocks 2, 3, 6 and 8 are illustrated by the dotted gray filling, and the overlap of the Selective RACK Map with the type 2 Cumulative with Selective RACK Map is illustrated by diagonal stripes. As a result, using the type 2 Cumulative with Selective RACK Map for this segment, beginning with the BSN, the RACK data stream may be "01110101." Alternatively, using the type 2 Cumulative with Selective RACK Map for this segment, beginning with the BSN, the RACK data stream may be "10101011." In either case, the RACK data stream may be any combination of bits representing "011" and "10101."

RACK type 3, referred to herein as "Cumulative with R-Block Sequence," may be used to identify the ACK and NACK of the reported data blocks. Here, "1" may refer to ACK and "0" may refer to NACK. In this example, in addition to the data blocks 1 and 7 of the ACK, data blocks 2 and 3 should be reported as ACK, data blocks 4-7 should be reported as NACK, and data block 8 should be reported as ACK. Therefore, the Sequence ACK Map is "101," and the lengths of the following blocks are "0010," "0100," and "0001."

Using the exemplary ACK and RACK indicators, the control node, e.g., BS 430, can obtain information and determine the resource allocation for each segment. In resource allocation, for example, the required number of resources can be abstracted. In one embodiment, the number of non-indicated bits in the Selective RACK Map (RACK Type 0 and RACK Type 2) and the length of the block sequences (RACK Type 1, RACK Type 2, and RACK Type 3) may identify the number of required resources for retransmission. In data retransmission, the exact data block required for retransmission may also be abstracted. For example, data indicated by "0" in the Selective/Cumulative RACK Maps (RACK Type 0, RACK Type 1, and RACK Type 2) and indicated in the sequence of NACK blocks in the Cumulative with R-Block Sequence ACK Map may be identified for retransmission.

Figure 16:
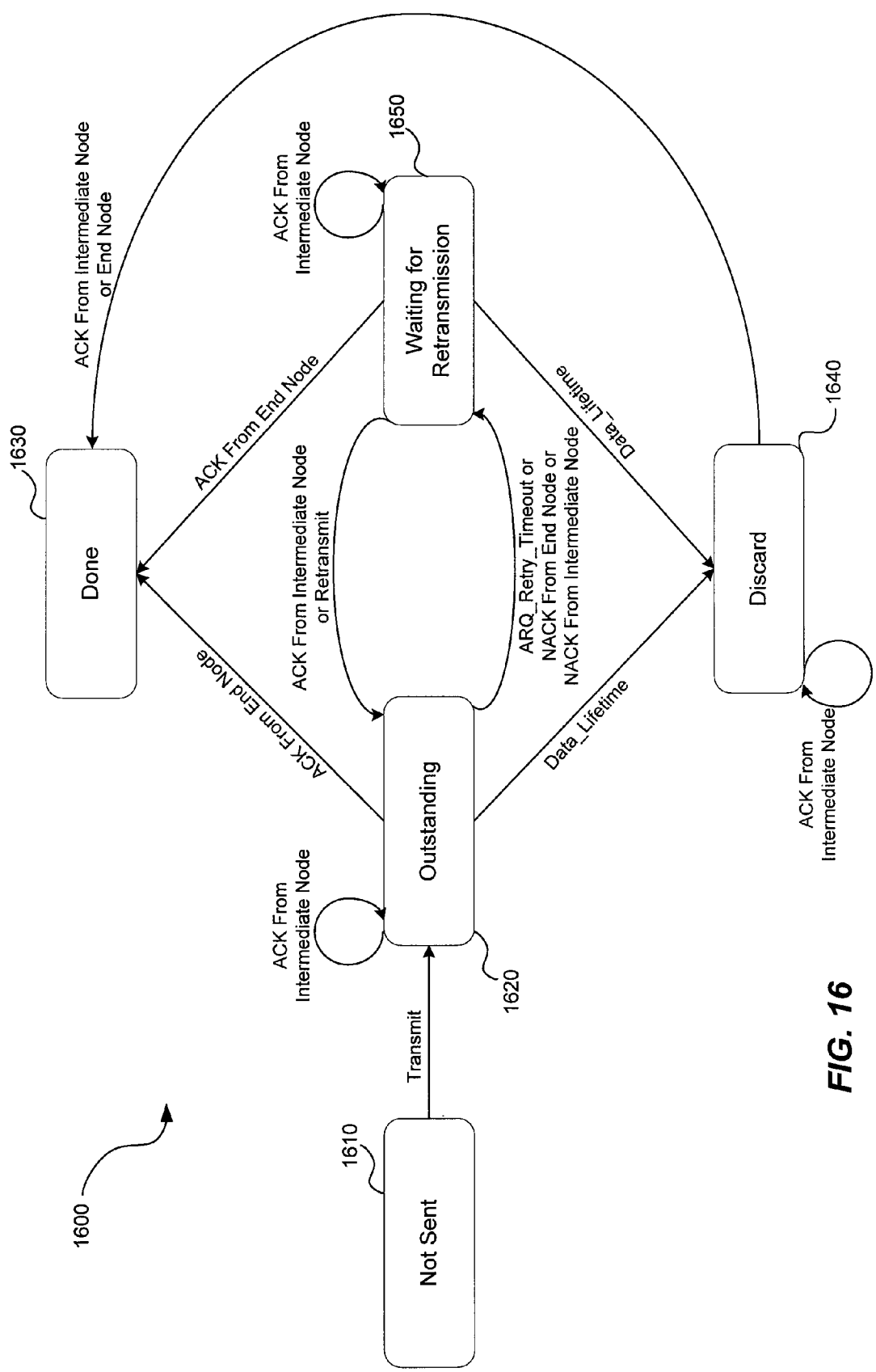
FIG. 16 is a state diagram of an exemplary state machine, consistent with certain disclosed embodiments.

FIG. 16 illustrates an exemplary ARQ state diagram 1600 according to certain disclosed embodiments. Generally, a state diagram may be used to depict the status and/or operation of a state machine in response to one or more triggering events. A state machine may be used to store a status of a device or apparatus, change the status of the device or apparatus, and/or cause the device or apparatus to perform one or more actions in response to one or more triggering events.

A state machine may be implemented using any combination of software and/or hardware. In one exemplary embodiment, each of RS 440 and BS 430 may be configured to include one or more state machines. In one exemplary embodiment, referring to FIG. 5c, each RS 440 and each BS 430 may include one or more state machines, implemented using a combination of software stored on, e.g., RAM 442 or ROM 443, and hardware configured to perform a process or action based upon one or more triggering events. For example, when a triggering event is received and/or identified by RS 440, an interrupt may be sent to CPU 441, causing CPU 441 to initiate one or more processes. In some embodiments, a state machine may be associated with a set of transmissions to a particular receiving device, e.g., SS 450 and/or BS 430. In other embodiments, a state machine may be associated with each transmission to a particular receiving device, e.g., SS 450 and/or BS 430. For reasons of simplicity and not limitation, description of FIG. 16 will be made with reference to an exemplary ARQ state machine of RS 440. However, BS 430 may also implement an ARQ state machine, and its corresponding functionality, such as disclosed in exemplary state diagram 1600 of FIG. 16.

As shown in FIG. 16, an exemplary ARQ state machine of RS 440 and/or BS 430 may include a plurality of states (e.g., Not Sent 1610, Outstanding 1620, Done 1630, Discard 1640, and Waiting for Retransmission 1650), and operation of the ARQ state machine may involve transitioning from one state to another. In one exemplary embodiment, the ARQ state may be defined in an ARQ control block or a tunnel data unit (TDU). A TDU may be used to pack several packet data units (PDUs) or ARQ data blocks into a single transmission data unit. The exemplary ARQ state diagram illustrated in FIG. 16 may be applied to any type of data unit transmission, including, for example, PDUs, TDUs, ARQ data blocks, etc.

Before data is sent by RS 440, the state of the ARQ state machine of RS 440 may be Not Sent 1610. In some embodiments, the ARQ state machine may be initially-set, or initialized, to Not Sent 1610. Upon transmission of the data to another node in the network, the ARQ state machine of RS 440 may move to Outstanding 1620, and may remain in Outstanding 1620 until one or more triggering events occurs. For example, in a case where no data errors occur, RS 440 may receive an ACK from the end node (e.g., SS 450), and the ARQ state machine of RS 440 may therefore move from Outstanding 1620 to Done 1630. If, however, RS 440 receives an ACK from another intermediate node (e.g., another RS 440) before it receives an ACK from the end node (e.g., SS 450), implying that some node successfully transmitted the data to the end node, the ARQ state machine of RS 440 may stay in Outstanding 1620, and wait for retransmission between the other intermediate node and the end node. In one exemplary embodiment, when RS 440 receives an ACK from an intermediate node, instead of moving from one state to another, the ARQ state machine of RS 440 may remain in Outstanding 1620.

Certain triggering events may cause RS 440 to move from Outstanding 1620 to Waiting for Retransmission 1650. For example, if an ARQ_Retry_Timeout occurs, the ARQ state machine of RS 440 may move to Waiting for Retransmission 1650. The occurrence of an ARQ_Retry_Timeout may reflect the lapse of a predetermined period of time associated with trying to retransmit the data. The ARQ state machine of RS 440 may remain in Waiting for Retransmission 1650 until it receives an ACK from the end node or another intermediate node or until the data is retransmitted. Similarly, the ARQ state machine of RS 440 may move from Outstanding 1620 to Waiting for Retransmission 1650 when it receives a NACK from an end node (e.g., SS 450) or an intermediate node (e.g., another RS 440). The ARQ state machine of RS 440 may remain in Waiting for Retransmission 1650 until it receives a triggering event. In one exemplary embodiment, the ARQ state machine of RS 440 may remain in Waiting for Retransmission 1650 until it receives an ACK from the end node or another intermediate node or until the data needs to be retransmitted.

In one exemplary embodiment, once RS 440 receives an ACK from another intermediate node or the data needs to be retransmitted, the ARQ state machine of RS 440 will move from Waiting for Transmission 1650 back to Outstanding 1620. In some embodiments, the data may be retransmitted before the ARQ state machine of RS 440 changes from one state to another. In other embodiments, the ARQ state machine of RS 440 may change from one state to another before the data is retransmitted. If, however, data transmission or retransmission is not completed within a lifetime value of the data, referred to as the "Data_Lifetime," the data is discarded and the ARQ state machine of RS 440 moves to Discard 1640. In another exemplary embodiment, instead of transitioning from Waiting for Retransmission 1650 to Outstanding 1620 upon receipt of an ACK from an intermediate node, the ARQ state machine of RS 440 may remain in Waiting for Retransmission 1650 until another of one or more predetermined triggering events occurs.

In two-segment ARQ mode, there may be two types of state machines: an access link ARQ state machine and a relay link ARQ state machine. The access link ARQ state machine may operate in association with transmissions between an SS 450 and its access RS 440 (i.e., the network access point for the SS 450) utilizing the access link. The relay link ARQ state machine may operate in association with transmissions between BS 430 and the access RS 440 utilizing the relay link. When operating according to two-segment ARQ mode, BS 430 may schedule retransmission to access RS 440 when an ARQ block or TDU is corrupted or lost in the relay link. Correspondingly, RS 440 may schedule retransmission to SS 450 when an ARQ block or TDU is corrupted in the access link. When an intermediate RS 440 exists between BS 430 and an access RS 440, the intermediate RS 440 may forward the ARQ block and ARQ information between BS 430 and the access RS 440.

In a system using non-tunnel mode, the ARQ Information Element (IE) corresponding to non-tunnel transmission may be used by BS 430 and an access RS 440 to indicate ACK and/or NACK of the data transmitted between the BS 430 and the access RS 440. In a system using tunnel mode, the ARQ IE for tunnel packet transmission may be used by BS 430 and an access RS 440 to indicate ACK and/or NACK of the data transmitted between the BS 430 and the access RS 440. In both modes (i.e., tunnel and non-tunnel transmission mode), the ARQ IEs are transported either as a packed payload (i.e., "piggybacked") with a packed MAC PDU or as a payload of a standalone MAC PDU.

The disclosed embodiments may be implemented within any network configuration utilizing W-CDMA technology, protocols, or standards. In particular, the disclosed embodiments may reduce signal processing time and improve data traffic flow associated with error detection and retransmission of data in W-CDMA-based networks.

The disclosed embodiments may improve performance in wireless networks and/or systems. In contrast to the disclosed embodiments, in a system utilizing conventional error detection and correction, the system and/or network may not effectively utilize resources associated with intra-cell handover (e.g., between RS 120c and RS 120b) and inter-cell handover (e.g., between RS 120c and an RS 120 outside the coverage of BS 110), and therefore the effects of error detection and correction in a wireless network may be increased. For example, referring to FIG. 4, if SS 450c moves from RS 440c to RS 440b, and only conventional error detection and correction is practiced, packet data that may not yet have been transmitted by RS 440c to SS 450c before handover may be lost, requiring end-to-end retransmission of packet data. As another example, if SS 450c moves from RS 550c to another RS 550 outside of range of coverage of BS 430 (not shown in FIG. 4), and only conventional error detection and correction is practiced, packet data that may not yet have been transmitted by RS 440c to SS 450c before handover may also be lost, and require end-to-end retransmission of packet data. Thus, conventional error detection and correction in multi-hop transmission may cause significant increases in overhead, longer delays, and wasted resources. Therefore, consistent with the disclosed embodiments, by localizing the retransmission of packet data, improved performance may be achieved.

It will be apparent to those skilled in the art that various modifications and variations can be made in the system and method for reducing signal interference in communication networks. It is intended that the standard and examples be considered as exemplary only, with a true scope of the disclosed embodiments being indicated by the following claims and their equivalents.

What is claimed is:

1. A method for transmission control by an access device in a wireless communication system including a plurality of receiving devices, comprising:

receiving, from a super ordinate device, first transmission data for transmission to a subscriber device, wherein the access device communicates with the plurality of receiving devices, and the subscriber device is one of the plurality of receiving devices;

processing, by the access device, control information received by the access device to determine a destination for the first transmission data;

if the destination is not one of the plurality of receiving devices, discarding the first transmission data;

if the destination is one of the plurality of receiving devices:

transmitting the first transmission data to the subscriber device;

generating, by the access device, a first access receipt indicator corresponding to the first transmission data;

sending the first access receipt indicator to the super ordinate device;

subsequent to the receipt of the first transmission data and before receiving a retransmission of data corresponding to the first transmission data, retransmitting, if the access device does not receive a first subscriber receipt indicator from the subscriber device indicating that all of the first transmission data is received by the subscriber device, one or more portions of the first transmission data to the subscriber device;

receiving, by the access device, second transmission data for transmission to the subscriber device;

transmitting the second transmission data to the subscriber device;

generating, by the access device, a second access receipt indicator corresponding to the second transmission data;

sending the second access receipt indicator to the super ordinate device; and retransmitting, if the access device does not receive a second subscriber receipt indicator from the subscriber device indicating that all of the second transmission data is received by the subscriber device, one or more portions of the second transmission data to the subscriber device.

2. The method as in claim 1, further including:
retransmitting, if the access device does not receive the first subscriber receipt indicator from the subscriber device indicating that the first transmission data is received by the subscriber device, the one or more portions of the first transmission data to the subscriber device; and
receiving, from the subscriber device, one or more subsequent first subscriber receipt indicators corresponding to the one or more portions of the first transmission data.

3. The method as in claim 2, wherein the first subscriber receipt indicator identifies one or more packets included in the first transmission data that were successfully received by the subscriber device, the second subscriber receipt indicator identifies one or more packets included in the second transmission data that were successfully received by the subscriber device, and the one or more subsequent first subscriber receipt indicators identify one or more packets included in the one or more portions of the first transmission data that were successfully received by the subscriber device.

4. The method as in claim 2, wherein the first subscriber receipt indicator identifies one or more packets included in the first transmission data that were successfully received by the subscriber device, the second subscriber receipt indicator identifies one or more packets included in the second transmission data that were successfully received by the subscriber device, and the one or more subsequent first subscriber receipt indicators includes at least one of an acknowledgment (ACK) or a negative acknowledgment (NACK) indicator.

5. The method as in claim 1, further including:
retransmitting, if the access device does not receive the second subscriber receipt indicator from the subscriber device indicating that the second transmission data is received by the subscriber device, the one or more portions of the second transmission data to the subscriber device; and
receiving, from the subscriber device, one or more subsequent second subscriber receipt indicators corresponding to the one or more portions of the second transmission data.

6. The method as in claim 5, wherein the first subscriber receipt indicator identifies one or more packets included in the first transmission data that were successfully received by the subscriber device, the second subscriber receipt indicator identifies one or more packets included in the second transmission data that were successfully received by the subscriber device, and the one or more subsequent second subscriber receipt indicators identifies one or more packets included in the one or more portions of the second transmission data that were successfully received by the subscriber device.

7. The method as in claim 6, wherein each of the first subscriber receipt indicator identifies one or more packets included in the first transmission data that were successfully received by the subscriber device, the second subscriber receipt indicator identifies one or more packets included in the second transmission data that were successfully received by the subscriber device, and the one or more subsequent second subscriber receipt indicators include at least one of an acknowledgment (ACK) or a negative acknowledgment (NACK) indicator.

8. The method as in claim 1, wherein the first access receipt indicator identifies one or more packets included in the first transmission data that were successfully received by the access device, and the second access receipt indicator identifies one or more packets included in the second transmission data that were successfully received by the access device.

9. The method as in claim 8, wherein each of the first access receipt indicator and the second access receipt indicator includes a Relay ACK (RACK) indicator.

10. A wireless communication device for wireless communication in a wireless communication system including a plurality of receiving devices, the wireless communication device comprising:
at least one memory to store data and instructions; and
at least one processor configured to access the memory and, when executing the instructions, to:
receive, from a super ordinate device, first transmission data for transmission to a subscriber device, wherein the wireless communication device communicates with the plurality of receiving devices, and the subscriber device is one of the plurality of receiving devices;
process, by the access device, control information received by the access device to determine a destination for the first transmission data;
if the destination is not one of the plurality of receiving devices, discard the first transmission data;
if the destination is one of the plurality of receiving devices:
transmit the first transmission data to the subscriber device;
generate a first access receipt indicator corresponding to the first transmission data;
send the first access receipt indicator to the super ordinate device;
subsequent to the receipt of the first transmission data and before receiving a retransmission of data corresponding to the first transmission data, retransmit, if the wireless communication device does not receive a first subscriber indicator from the subscriber device indicating that all of the first transmission data is received by the subscriber device, one or more portions of the first transmission data to the subscriber device;
receive second transmission data for transmission to the subscriber device;
transmitting the second transmission data to the subscriber device;
generate a second access receipt indicator corresponding to the second transmission data;
send the second access receipt indicator to the super ordinate device; and
retransmit, if the wireless communication device does not receive a second subscriber receipt indicator from the subscriber device indicating that all of the second transmission data is received by the subscriber device, one or more portions of the second transmission data to the subscriber device.

11. The wireless communication device as in claim 10, wherein the processor is further configured to:
retransmit, if the wireless communication device does not receive the first subscriber receipt indicator from the subscriber device indicating that the first transmission data is received by the subscriber device, the one or more portions of the first transmission data to the subscriber device; and
receive, from the subscriber device, one or more subsequent first subscriber receipt indicators corresponding to the one or more portions of the first transmission data.

12. The wireless communication device as in claim 11, wherein the first subscriber receipt indicator identifies one or more packets included in the first transmission data that were successfully received by the subscriber device, the second subscriber receipt indicator identifies one or more packets included in the second transmission data that were successfully received by the subscriber device, and the one or more subsequent first subscriber receipt indicators identify one or more packets included in the one or more portions of the first transmission data that were successfully received by the subscriber device.

13. The wireless communication device as in claim 11, wherein the first subscriber receipt indicator identifies one or more packets included in the first transmission data that were successfully received by the subscriber device, the second subscriber receipt indicator identifies one or more packets included in the second transmission data that were successfully received by the subscriber device, and the one or more subsequent first subscriber receipt indicators includes at least one of an acknowledgment (ACK) or a negative acknowledgment (NACK) indicator.

14. The wireless communication device as in claim 10, wherein the processor is further configured to:
retransmit, if the wireless communication device does not receive the second subscriber receipt indicator from the subscriber device indicating that the second transmission data is received by the subscriber device, the one or more portions of the second transmission data to the subscriber device; and
receive, from the subscriber device, one or more subsequent second subscriber receipt indicators corresponding to the one or more portions of the second transmission data.

15. The wireless communication device as in claim 14, wherein the first subscriber receipt indicator identifies one or more packets included in the first transmission data that were successfully received by the subscriber device, the second subscriber receipt indicator identifies one or more packets included in the second transmission data that were successfully received by the subscriber device, and the one or more subsequent second subscriber receipt indicators identifies one or more packets included in the one or more portions of the second transmission data that were successfully received by the subscriber device.

16. The wireless communication device as in claim 15, wherein each of the first subscriber receipt indicator identifies one or more packets included in the first transmission data that were successfully received by the subscriber device, the second subscriber receipt indicator identifies one or more packets included in the second transmission data that were successfully received by the subscriber device, and the one or more subsequent second subscriber receipt indicators include at least one of an acknowledgment (ACK) or a negative acknowledgment (NACK) indicator.

17. The wireless communication device as in claim 10, wherein the first access receipt indicator identifies one or more packets included in the first transmission data that were successfully received by the access device, and the second access receipt indicator identifies one or more packets included in the second transmission data that were successfully received by the access device.

18. The wireless communication device as in claim 17, wherein each of the first access receipt indicator and the second access receipt indicator includes a Relay ACK (RACK) indicator.

19. A method for transmission control by an access device in a wireless communication system including a plurality of receiving devices, comprising:
receiving, from a super ordinate device, transmission data for transmission to a subscriber device, wherein the access device communicates with the plurality of receiving devices, and the subscriber device is one of the plurality of receiving devices;
processing, by the access device, control information received by the access device to determine a destination for the first transmission data;
if the destination is not one of the plurality of receiving devices, discarding the first transmission data;
if the destination is one of the plurality of receiving devices:
transmitting the transmission data to the subscriber device;
generating an access receipt indicator corresponding to the transmission data;
if the access device receives an initial subscriber receipt indicator from the subscriber device:
including the access receipt indicator with the initial subscriber receipt indicator, and
sending the access receipt indicator and the subscriber receipt indicator to the super ordinate device; and
if the access device does not receive the initial subscriber receipt indicator from the subscriber device:
sending the access receipt indicator to the super ordinate device, and
subsequent to the receipt of the transmission data and before receiving a retransmission of data corresponding to the transmission data, retransmitting at least a portion of the transmission data to the subscriber device.

20. The method as in claim 19, wherein when the access device receives the initial subscriber receipt indicator indicating that less than the transmission data sent to the subscriber device was successfully received, the method further includes:
retransmitting one or more portions of the transmission data that is not identified by the initial subscriber receipt indicator as successfully received by the subscriber device.

21. The method as in claim 20, further including:
receiving one or more supplemental subscriber receipt indicators corresponding to the first transmission data;
comparing the one or more supplemental subscriber receipt indicators;
receiving, from the super ordinate device, subsequent transmission data;
transmitting the received second transmission data to the subscriber station;
generating a subsequent access receipt indicator corresponding to the subsequent received transmission data;
receiving, from the subscriber device, a subsequent subscriber receipt indicator corresponding to the subsequent transmission data;
combining the subsequent subscriber receipt indicator and the compared one or more supplemental subscriber receipt indicators into a combined subscriber receipt indicator;
including the subsequent access receipt indicator with the combined subscriber receipt indicator; and
sending, to the super ordinate device, the subsequent access receipt indicator and the combined subscriber receipt indicator.

22. The method as in claim 20, further including:
receiving one or more supplemental subscriber receipt indicators corresponding to the first transmission data;

comparing the one or more supplemental subscriber receipt indicators;
receiving, from the super ordinate device, subsequent transmission data;
transmitting the received second transmission data to the subscriber station;
generating a subsequent access receipt indicator corresponding to the subsequent received transmission data;
receiving, from the subscriber device, a subsequent subscriber receipt indicator corresponding to the subsequent transmission data;
combining the initial subscriber receipt indicator, the subsequent subscriber receipt indicator, and the compared one or more supplemental subscriber receipt indicators into a combined subscriber receipt indicator;
including the subsequent access receipt indicator with the combined subscriber receipt indicator; and
sending, to the super ordinate device, the subsequent access receipt indicator and the combined subscriber receipt indicator.

23. The method as in claim 19, further including:
initiating a timer, wherein the timer is set according to a round-trip transmission time between the access device and the subscriber device; and
if the access device does not receive the subscriber receipt indicator from the subscriber device before the timer expires:
 sending the access receipt indicator to the super ordinate device, and
 retransmitting the transmission data to the subscriber device.

24. The method as in claim 23, further including:
generating an access subscriber receipt indicator including an indication of any data acknowledged to the access device by the subscriber device;
including the access subscriber receipt indicator with the access receipt indicator; and
sending the access receipt indicator and the included access subscriber receipt indicator to the super ordinate device.

25. The method as in claim 19, further including:
initiating a first timer, wherein the first timer is set according to a round-trip transmission time between the access device and the subscriber device; and
if the access device does not receive the subscriber receipt indicator from the subscriber device before the first timer expires:
 sending the access receipt indicator to the super ordinate device,
 retransmitting the transmission data to the subscriber device,
 initiating a second timer, wherein the second timer is set according to a round-trip transmission time between the access device and the subscriber device, and
 sending, if the access device does not receive a retransmission receipt indicator from the subscriber device before the second timer expires, the access receipt indicator to the super ordinate device.

26. The method as in claim 25, wherein when the access device does not receive the receipt indicator from the subscriber device before the first timer expires, the method further includes:
generating an initial access subscriber receipt indicator including an indication of the transmission data acknowledged by the subscriber device;
including the initial access subscriber receipt indicator with the access receipt indicator; and
sending the access node receipt indicator and the included initial access subscriber receipt indicator to the super ordinate device.

27. The method as in claim 25, wherein when the access device does not receive the receipt indicator from the subscriber device before the second timer expires, the method further includes:
generating a subsequent access subscriber receipt indicator including an indication of the transmission data acknowledged by the subscriber device subsequently to the generation of the initial access subscriber indicator; and
sending the subsequent access subscriber receipt indicator and the access receipt indicator to the super ordinate device.

28. The method as in claim 25, wherein when the access device does not receive the receipt indicator from the subscriber device before the timer expires, the method further includes:
generating an access subscriber receipt indicator including an indication of any data acknowledged to the access device by the subscriber device; and
sending the access subscriber receipt indicator and the access receipt indicator to the super ordinate device.

29. The method as in claim 25, wherein when the access device receives a subscriber receipt indicator indicating that a portion of the transmission data was not successfully received by the subscriber device, the method further including:
retransmitting the portion of the transmission data identified by the subscriber receipt indicator as not successfully received by the subscriber device.

30. The method as in claim 29, further including:
receiving one or more subscriber retransmission receipt indicators;
forwarding the one or more subscriber retransmission receipt indicators to the super ordinate device; and
retransmitting any retransmitted portions of the transmission data indicated by the one or more subscriber retransmission receipt indicators as not successfully received by the subscriber device.

31. A wireless communication device for wireless communication in a wireless communication system including a plurality of receiving devices, the wireless communication device comprising:
at least one memory to store data and instructions; and
at least one processor configured to access the memory and, when executing the instructions, to:
 receive, from a super ordinate device, transmission data for transmission to a subscriber device, wherein the wireless communication device communicates with the plurality of receiving devices, and the subscriber device is one of the plurality of receiving devices;
 process, by the access device, control information received by the access device to determine a destination for the first transmission data;
 if the destination is not one of the plurality of receiving devices, discard the first transmission data;
 if the destination is one of the plurality of receiving devices:
  transmit the transmission data to the subscriber device;
  generate an access receipt indicator corresponding to the transmission data;
  if the wireless communication device receives an initial subscriber receipt indicator from the subscriber device:

include the access receipt indicator with the initial subscriber receipt indicator, and
send the access receipt indicator and the subscriber receipt indicator to the super ordinate device; and
if the wireless communication device does not receive the initial subscriber receipt indicator from the subscriber device:
send the access receipt indicator to the super ordinate device, and
subsequent to the receipt of the transmission data and before receiving a retransmission of data corresponding to the transmission data, retransmit at least a portion of the transmission data to the subscriber device.

32. The wireless communication device as in claim 31, wherein when the wireless communication device receives the initial subscriber receipt indicator indicating that less than all of the transmission data sent to the subscriber device was successfully received, the at least one processor is further configured to:
retransmit one or more portions of the transmission data that is not identified by the initial subscriber receipt indicator as successfully received by the subscriber device.

33. The wireless communication device as in claim 32, wherein the at least one processor is further configured to:
receive one or more supplemental subscriber receipt indicators corresponding to the first transmission data;
compare the one or more supplemental subscriber receipt indicators;
receive, from the super ordinate device, subsequent transmission data;
transmit the received second transmission data to the subscriber station;
generate a subsequent access receipt indicator corresponding to the subsequent received transmission data;
receive, from the subscriber device, a subsequent subscriber receipt indicator corresponding to the subsequent transmission data;
combine the subsequent subscriber receipt indicator and the compared one or more supplemental subscriber receipt indicators into a combined subscriber receipt indicator;
include the subsequent access receipt indicator with the combined subscriber receipt indicator; and
send, to the super ordinate device, the subsequent access receipt indicator and the combined subscriber receipt indicator.

34. The wireless communication device as in claim 32, wherein the at least one processor is further configured to:
receive one or more supplemental subscriber receipt indicators corresponding to the first transmission data;
compare the one or more supplemental subscriber receipt indicators;
receive, from the super ordinate device, subsequent transmission data;
transmit the received second transmission data to the subscriber station;
generate a subsequent access receipt indicator corresponding to the subsequent received transmission data;
receive, from the subscriber device, a subsequent subscriber receipt indicator corresponding to the subsequent transmission data;
combine the initial subscriber receipt indicator, the subsequent subscriber receipt indicator, and the compared one or more supplemental subscriber receipt indicators into a combined subscriber receipt indicator;
include the subsequent access receipt indicator with the combined subscriber receipt indicator; and
send, to the super ordinate device, the subsequent access receipt indicator and the combined subscriber receipt indicator.

35. The wireless communication device as in claim 31, wherein the at least one processor is further configured to:
initiate a timer, wherein the timer is set according to a round-trip transmission time between the wireless communication device and the subscriber device; and
if the wireless communication device does not receive the subscriber receipt indicator from the subscriber device before the timer expires:
send the access receipt indicator to the super ordinate device, and
retransmit the transmission data to the subscriber device.

36. The wireless communication device as in claim 35, wherein the at least one processor is further configured to:
generate an access subscriber receipt indicator including an indication of any data acknowledged to the wireless communication device by the subscriber device;
include the access subscriber receipt indicator with the access receipt indicator; and
send the access receipt indicator and the included access subscriber receipt indicator to the super ordinate device.

37. The wireless communication device as in claim 31, wherein the at least one processor is further configured to:
initiate a first timer, wherein the first timer is set according to a round-trip transmission time between the wireless communication device and the subscriber device; and
if the wireless communication device does not receive the subscriber receipt indicator from the subscriber device before the first timer expires:
send the access receipt indicator to the super ordinate device,
retransmit the transmission data to the subscriber device,
initiate a second timer, wherein the second timer is set according to a round-trip transmission time between the wireless communication device and the subscriber device, and
send, if the wireless communication device does not receive a retransmission receipt indicator from the subscriber device before the second timer expires, the access receipt indicator to the super ordinate device.

38. The wireless communication device as in claim 37, wherein when the wireless communication device does not receive the receipt indicator from the subscriber device before the first timer expires, the at least one processor is further configured to:
generate an initial access subscriber receipt indicator including an indication of the transmission data acknowledged by the subscriber device;
include the initial access subscriber receipt indicator with the access receipt indicator; and
send the access node receipt indicator and the included initial access subscriber receipt indicator to the super ordinate device.

39. The wireless communication device as in claim 37, wherein when the wireless communication device does not receive the receipt indicator from the subscriber device before the second timer expires, the at least one processor is further configured to:
generate a subsequent access subscriber receipt indicator including an indication of the transmission data acknowledged by the subscriber device subsequently to the generation of the initial access subscriber indicator; and send the subsequent access subscriber receipt indicator and the access receipt indicator to the super ordinate device.

40. The wireless communication device as in claim 37, wherein when the wireless communication device does not receive the receipt indicator from the subscriber device before the timer expires, the at least one processor is further configured to:

generate an access subscriber receipt indicator including an indication of any data acknowledged to the wireless communication device by the subscriber device; and send the access subscriber receipt indicator and the access receipt indicator to the super ordinate device.

41. The wireless communication device as in claim 37, wherein when the wireless communication device receives a subscriber receipt indicator indicating that a portion of the transmission data was not successfully received by the subscriber device, the at least one processor is further configured to:

retransmit the portion of the transmission data identified by the subscriber receipt indicator as not successfully received by the subscriber device.

42. The wireless communication device as in claim 41, wherein the at least one processor is further configured to:

receive one or more subscriber retransmission receipt indicators;

forward the one or more subscriber retransmission receipt indicators to the super ordinate device; and retransmit any retransmitted portions of the transmission data indicated by the one or more subscriber retransmission receipt indicators as not successfully received by the subscriber device.

43. A method for operating a wireless communication device in a wireless communication system, the method comprising:

setting a device state to a first state, wherein the first state is an initial state;

changing, upon occurrence of a first triggering event, the device state from the first state to a second state, wherein the second state is defined as one in which data has been transmitted and a relay timer has not expired;

changing, when the relay timer expires, the device state from the second state to a third state and initiating retransmission of the data;

changing, when the relay timer has not expired and the wireless communication device receives one of an intermediate node NACK indicator, an end node NACK indicator, or a timeout, the device state from the second state to the third state, wherein when the device is in the third state, discarding the data if the relay timer expires; and changing, when the wireless communication device receives an end node ACK indicator and the relay timer has not expired, the device state from the second state to a fourth state.

44. The method of claim 43, further including:

maintaining, when the wireless communication device receives an intermediate node ACK indicator, the second state as the device state.

45. The method of claim 43, further including:

maintaining, when the device state is in the third state and the wireless communication device receives either the intermediate node ACK indicator or a retransmission indicator, the third state as the device state.

46. The method of claim 43, further including:

changing, when the device state is in the third state and the data needs to be retransmitted, the device state from the third state to the second state; and initiating retransmission of the data.

47. The method of claim 43, further including:

changing, when the device state is in the third state and the wireless communication device receives the intermediate node ACK indicator, the device state from the third state to the second state.

48. The method of claim 43, further including:

changing, when the device state is in the third state and the wireless communication device receives the end node ACK indicator, the device state from the third state to the fourth state.

49. The method of claim 43, further including:

changing, when the device state is in the third state and the relay timer expires, the device state from the third state to a fifth state.

50. The method of claim 43, further including:

changing, if the device state is in a fifth state and the wireless communication device receives an end node ACK indicator, the device from the fifth state to the fourth state.

51. The method of claim 43, further including:

maintaining, if the device state is in a fifth state and the wireless communication device receives an intermediate node ACK indicator, the fifth state as the device state.

52. The method of claim 43, further including:

changing, when the device state is in one of the second state or the fourth state, and the wireless communication device receives a data-lifetime timeout, the device state from the one of the second state or the fourth state to the fifth state.

53. The method of claim 43, wherein the first triggering event is a transmission of new data.

54. A wireless communication device for wireless communication, the wireless communication device comprising:

at least one memory to store data and instructions; and at least one processor configured to access the memory and, when executing the instructions, to:

set a device state to a first state, wherein the first state is an initial state;

change, upon occurrence of a first triggering event, the device state from the first state to a second state, wherein the second state is defined as one in which data has been transmitted and a relay timer has not expired;

change, when the relay timer expires, the device state from the second state to a third state and initiate retransmission of the data;

change, when the relay timer has not expired and the wireless communication device receives one of an intermediate node NACK indicator, an end node NACK indicator, or a timeout, the device state from the second state to the third state wherein when the device is in the third state, discard the data if the relay timer expires; and change, when the wireless communication device receives an end node ACK indicator and the relay timer has not expired, the device state from the second state to a fourth state.

55. The wireless communication device of claim 54, wherein the processor is further configured to:

maintain, when the wireless communication device receives an intermediate node ACK indicator, the second state as the device state.

56. The wireless communication device of claim 54, wherein the processor is further configured to:
maintain, when the device state is in the third state and the wireless communication device receives either the intermediate node ACK indicator or a retransmission indicator, the third state as the device state.

57. The wireless communication device of claim 54, wherein the processor is further configured to:
change, when the device state is in the third state and the data needs to be retransmitted, the device state from the third state to the second state; and
initiate retransmission of the data.

58. The wireless communication device of claim 54, wherein the processor is further configured to:
change, when the device state is in the third state and the wireless communication device receives the intermediate node ACK indicator, the device state from the third state to the second state.

59. The wireless communication device of claim 54, wherein the processor is further configured to:
change, when the device state is in the third state and the wireless communication device receives the end node ACK indicator, the device state from the third state to the fourth state.

60. The wireless communication device of claim 54, wherein the processor is further configured to:
change, when the device state is in the third state and the relay timer expires, the device state from the third state to a fifth state.

61. The wireless communication device of claim 54, wherein the processor is further configured to:
change, if the device state is in a fifth state and the wireless communication device receives an end node ACK indicator, the device from the fifth state to the fourth state.

62. The wireless communication device of claim 54, wherein the processor is further configured to:
maintain, if the device state is in a fifth state and the wireless communication device receives an intermediate node ACK indicator, the fifth state as the device state.

63. The wireless communication device of claim 54, wherein the processor is further configured to:
maintain, when the device state is in a fifth state and the wireless communication device receives an intermediate node ACK indicator, the fifth state as the device state.

64. The wireless communication device of claim 54, wherein the processor is further configured to:
change, when the device state is in one of the second state or the fourth state, and the wireless communication device receives a data lifetime timeout, the device state from the one of the second state or the fourth state to a fifth state.

65. The wireless communication device of claim 54, wherein the first triggering event is a transmission of new data.

* * * * *